Figure 1:
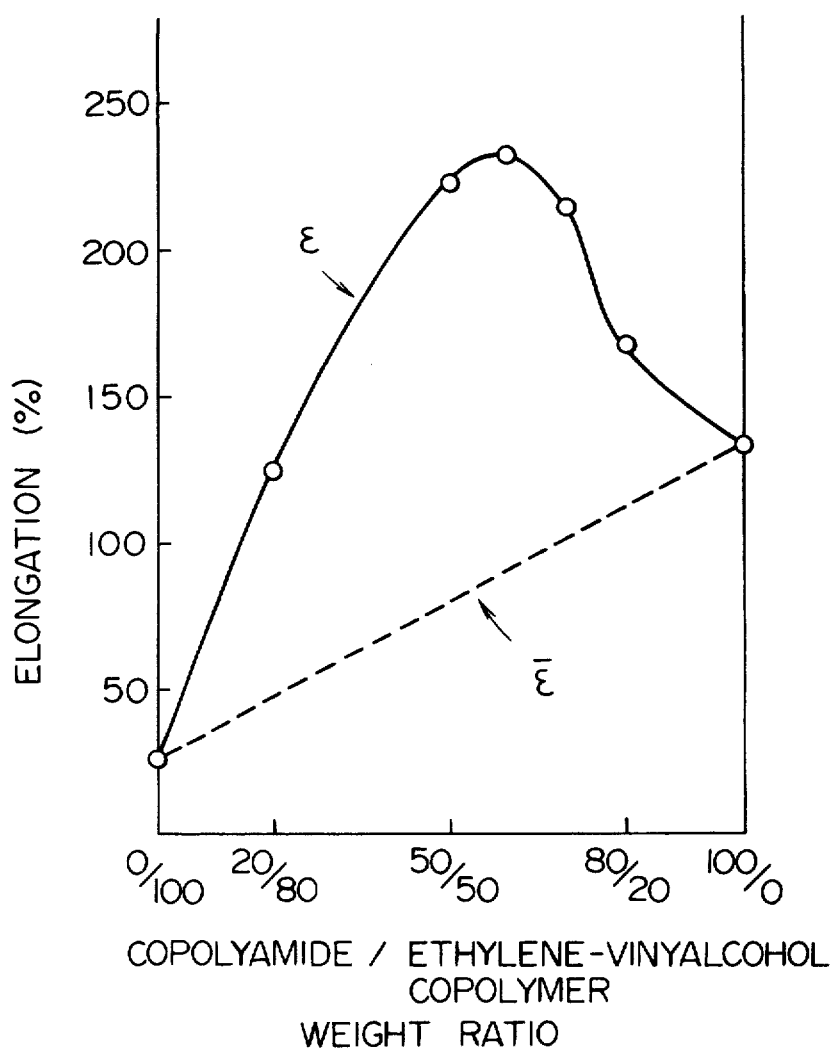

United States Patent [19]

Yamada et al.

[11] 4,261,473
[45] Apr. 14, 1981

[54] MOLDED CONTAINER HAVING WALL COMPOSED OF ORIENTED RESIN BLEND

[75] Inventors: Muneki Yamada, Ebina; Sadao Hirata, Yokohama; Shunsaku Hirata, Yokohama; Akira Kishimoto, Yokohama; Fumio Kano, Kamakura; Jinichi Yazaki, Tokyo; Toru Suzuki, Yokosuka, all of Japan

[73] Assignee: Toyo Seikan Kaisha Limited, Tokyo, Japan

[21] Appl. No.: 750,376

[22] Filed: Dec. 14, 1976

[30] Foreign Application Priority Data

Dec. 17, 1975 [JP] Japan ............................. 50/149564
May 20, 1976 [JP] Japan ............................. 51/57192

[51] Int. Cl.³ .................. B65D 23/00; B32B 27/08; B32B 27/30; B32B 27/36
[52] U.S. Cl. ............................ 215/1 C; 264/532; 264/73; 264/544; 264/512; 428/35; 428/411; 428/412; 428/413; 428/474.4; 428/474.7; 428/475.2; 428/476.3; 428/476.9; 428/477.4; 428/480; 428/483; 428/500; 428/501; 428/515; 428/517; 428/518; 428/519; 428/520; 428/521; 428/522; 428/523; 428/910
[58] Field of Search ............ 428/35, 412, 474, 480, 428/483, 500, 501, 515, 516, 517, 518, 519, 520, 521, 522, 523, 910, 411, 413, 474.4, 474.7, 475.2, 476.3, 476.9, 477.4; 215/1 C; 264/94, 98, 73, 532, 544, 550, 551, 553, 554, 515, 512

[56] References Cited

U.S. PATENT DOCUMENTS

| | | | |
|---|---|---|---|
| 3,288,317 | 11/1966 | Wiley | 215/1 C |
| 3,757,978 | 9/1973 | Gilbert | 215/1 C |
| 3,837,517 | 9/1974 | Held, Jr. | 215/1 C |
| 3,857,754 | 12/1974 | Hirata et al. | 428/519 |
| 3,931,449 | 1/1976 | Hirata et al. | 428/35 |
| 3,932,692 | 1/1976 | Hirata et al. | 428/474 |
| 3,934,743 | 1/1976 | McChesney et al. | 215/1 C |
| 3,955,697 | 5/1976 | Valyi | 428/412 |
| 4,182,457 | 1/1980 | Yamada et al. | 215/1 C |

Primary Examiner—William R. Dixon, Jr.
Attorney, Agent, or Firm—Diller, Ramik & Wight

[57] ABSTRACT

A molded container having a wall composed of a thermoplastic resin oriented in at least one direction on the wall face, wherein the container wall has a layer of a blend composed mainly of a plurality of melt-extrudable thermoplastic resins, each of which has a solubility parameter (Sp) of at least 9.5, at least one of said thermoplastic resins has an oxygen permeability lower than $5 \times 10^{-11}$ cc·cm/cm²·sec·cmHg, said thermoplastic resins are chosen so that the difference ($\Delta$Sp) of the solubility parameter in said thermoplastic resins is not greater than 4.5, the elongation of said resin blend is higher than the arithmetic mean ($\epsilon$) of elongations of the respective thermoplastic resins, and wherein the container has a thermal shrinkability ($\delta$) of at least 5% in the orientation direction of said container wall.

11 Claims, 7 Drawing Figures

MOLDED CONTAINER HAVING WALL COMPOSED OF ORIENTED RESIN BLEND

This invention relates to plastic containers formed by plastic processing, especially plastic bottles, plastic cups and other plastic containers formed by draw-blow molding and plastic containers formed by plastic processing of sheets or films. More particularly, the invention relates to plastic containers having a desirable combination of a high gas barrier property to oxygen, carbon dioxide gas and the like with high mechanical strength, hardness, creep resistance and transparency.

In the instant specification, by the term "plastic processing" is meant cold or warm resin processing conducted by utilizing plastic deformation of a resin, which includes so-called "draw molding". The term "biaxial draw-blow molding" used herein has the same meaning as customarily adopted in the art. Namely, the "biaxial draw-blow molding" means a molding method in which a parison formed by extrusion molding, injection molding or the like is drawn in a split mold in the axial direction and simultaneously or successively drawn by blowing a gas in a direction normal to the axial direction. Further, the term "draw molding of a sheet or film" used herein means not only an ordinary elongating draw molding method but also a draw forming method, an ironing molding method, a vacuum molding method and a compressed air molding method.

It is known to prepare a biaxially drawn blow-molded article by molding a thermoplastic resin such as a polyolefin, especially polypropylene, into a bottomed or bottomless parison (hereinafter referred to as "pipe" or "tube" in some cases) and performing in sequence or simultaneously the step of elongating the parison in the axial direction at a relatively low temperature, for example, at a temperature lower than the melting point of the resin, and the step of inflating the parison in a direction rectangular to the axial direction.

It also is known to prepare biaxially drawn cup-like molded articles by molding a thermoplastic resin such as a polyolefin, especially polypropylene, into a sheet or film, and subjecting the sheet or film to plastic molding such as draw forming at a relatively low temperature, for example, at a temperature lower than the melting point of the resin, as taught in KUNSTSTOFFE. Bd., 1975, H. 10, 666/69.

In molded articles prepared according to these known plastic processing methods, various effects by the biaxial drawing orientation are manifested. Namely, they are excellent over ordinary heat-molded articles with respect to mechanical strength, hardness, creep resistance and transparency. These molded articles, however, are still insufficient as containers to be used in fields where a high pressure resistance and a high gas barrier property are required, for example, as containers for filling and preserving carbonated drinks, beer, other liquid foods, liquid medicines, liquid chemicals, liquid cosmetics and aerosol contents.

The above-mentioned polyolefin resins are excellent in the adaptability to biaxial draw molding and in transparency and mechanical strength, but they are defective in that the permeability of gases such as oxygen and carbon dioxide gas is relatively high. It is substantially impossible to apply a technique of such plastic molding to thermoplastic resins excellent in the gas barrier property (gas impermeability) to oxygen, carbon dioxide gas and the like because of their poor drawability.

As the melt-extrudable thermoplastic resin excellent in the gas barrier property, there have heretofore been known ethylene-vinyl alcohol copolymers (saponified ethylene-vinyl acetate copolymers) and various copolyamides. In general, these thermoplastic resins excellent in the gas barrier property have a low elongation, and when they are subjected to plastic processing, partial elongation or formation of pores is caused and it is very difficult to obtain satisfactory molded articles. This is particularly true, when a thermoplastic resin excellent in the gas barrier property is subjected to biaxial draw-blow molding, since the elongation in a direction normal to the extrusion direction is ordinarily low, troubles such as longitudinal tears are readily caused when the parison is drawn in said direction normal to the extrusion direction.

We found that when a plurality of thermoplastic resins excellent in the gas barrier property, which cannot or can hardly be subjected to plastic molding such as biaxial draw-blow molding because of the foregoing troubles if used singly and which have a solubility parameter (Sp value), detailed hereinafter, of at least 9.5, are selected and combined so that the difference ($\Delta$Sp value) of the solubility parameter in these thermoplastic resins is not greater than 4.5, plastic processing such as biaxial draw-blowing of the resulting resin blend becomes possible, and that a molded article of the resin blend formed by plastic processing has a gas permeability much lower than the arithmetric mean of the gas permeabilities of the respective resins and is excellent in such properties as transparency, strength and creep resistance. Based on these findings, we have now completed the present invention.

It is therefore a primary object of the present invention to provide a molded container formed by plastic processing which has a desirable combination of a high gas barrier property to oxygen, carbon dioxide gas and the like with high transparency, strength, creep resistance and hardness.

Another object of the present invention is to provide a technique of preparing a molded container according to plastic processing from a thermoplastic resin having a high gas barrier property which cannot or can hardly be molded according to plastic processing such as biaxial draw molding.

Still another object of the present invention is to provide pressure-resistant gas-barrier plastic bottles or cup-like seamless containers suitable for filling and preserving carbonated drinks, beer, other liquid foods, liquid medicines, liquid chemicals, liquid cosmetics, aerosol contents and the like.

In accordance with one aspect of the present invention, there is provided a molded container having a wall composed of a thermoplastic resin oriented in at least one direction on the wall face, wherein the container wall has a layer of a blend composed mainly of a plurality of melt-extrudable thermoplastic resins, each of which has a solubility parameter (Sp) of at least 9.5, at least one of said thermoplastic resins has an oxygen permeability lower than $5 \times 10^{-11}$ cc-cm/cm$^2$·sec·cmHg, said thermoplastic resins are chosen so that the difference ($\Delta$Sp) of the solubility parameter in said thermoplastic resins is not greater than 4.5, the elongation of said resin blend is higher than the arithmetic mean ($\epsilon$) of elongations of the respective thermoplastic resins, and wherein the container has a thermal shrinkability ($\delta$) of at least 5% in the orientation direction of said container wall.

In accordance with another aspect of the present invention, there is provided a container molded according to plastic processing, having a wall composed of a thermoplastic resin oriented in at least one direction on the wall face, wherein the container wall has a multi-layer structure including at least one layer of a blend composed of a plurality of melt-extrudable thermoplastic resins, each of which has a solubility parameter (Sp) of at least 9.5 and at least one layer composed of a thermoplastic resin having a moisture permeability lower than $100 \times 10^{-12}$ g·cm/cm$^2$·sec·cmHg as measured at a temperature not exceeding 50° C., at least one of said thermoplastic resins in the blend layer has an oxygen permeability lower than $5 \times 10^{-11}$ cc·cm/cm$^2$·sec·cmHg, said thermoplastic resins of the blend layer are chosen so that the difference ($\Delta$Sp) of the solubility parameter in said thermoplastic resins is not greater than 4.5, the elongation of said resin blend is higher than the arithmetic mean ($\bar{\epsilon}$) of elongations of the respective thermoplastic resins in the resin blend, said multi-layer structure has an interlaminar bonding strength of at least 20 g/cm, and wherein the multi-layer structure has a thermal shrinkability ($\delta$) of at least 5% in the orientation direction of said container wall.

In accordance with still another aspect of the present invention, there is provided a container formed by biaxial draw-blow molding of a parison composed of a thermoplastic resin or by plastic processing of a film or sheet composed of a thermoplastic resin, wherein said parison or said film or sheet has a multi-layer structure including at least one layer of a blend composed mainly of a plurality of melt-extrudable thermoplastic resins, each of which has a solubility parameter (Sp) of at least 9.5, and at least one layer composed of a thermoplastic resin in which the sum of the instantaneous modulus (Eg) and retardation modulus (E$_1$) at a temperature of 23° C. and a stress of $7 \times 10^7$ dyne/cm$^2$ is at least $1 \times 10^{10}$ dyne/cm$^2$ is and which has a steady state flow viscosity ($\eta\infty$) of at least $1 \times 10^{17}$ poise and a retardation time (t$_R$) shorter than $6 \times 10^6$ sec, at least one of said thermoplastic resins in said blend has an oxygen permeability lower than $5 \times 10^{-11}$ cc·cm/cm$^2$·sec·cmHg, the thermoplastic resins of said blend are chosen so that the difference ($\Delta$Sp) of the solubility parameter in said thermoplastic resins is not greater than 4.5, the elongation of said resin blend is higher than the arithmetic mean ($\bar{\epsilon}$) of elongations of the respective thermoplastic resins in the resin blend, and wherein said molded container has a thermal shrinkability ($\delta$) of at least 5% in the orientation direction of said container wall.

The present invention will now be described in detail.

Figure 2:
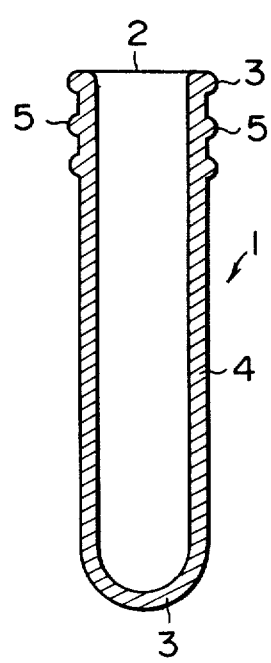
Figure 3:
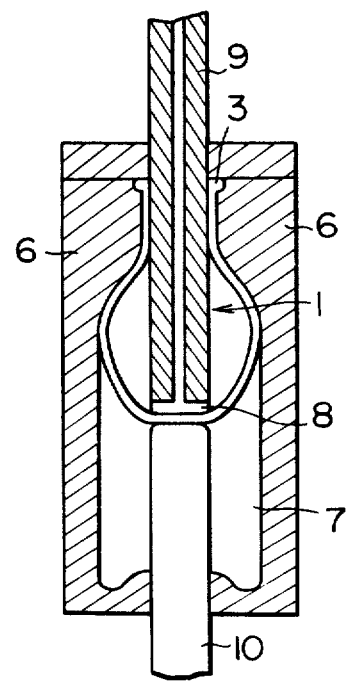

In the accompanying drawings,

FIG. 1 is a curve illustrating the relation between the copolyamide/ethylene-vinyl alcohol copolymer weight ratio and the elongation (%), FIG. 2 is a sectional view illustrating one example of a bottomed parison that is used for the production of the molded container of the present invention, FIG. 3 is a diagram illustrating the biaxial draw-blow molding method, and FIGS. 4 to 7 are diagrams illustrating the steps of the vacuum plug assist molding method.

RESIN BLEND

In the present invention, in view of the mechanical properties such as creep resistance and the gas barrier property, it is important that the container of the present invention molded by plastic processing should have a layer of a blend composed mainly of a plurality of melt-extrudable thermoplastic resins, each of which has a solubility parameter of at least 9.5.

In the instant specification and claims, the solubility parameter (Sp value) is defined as the square root of the cohesion energy density (cal/cc) as taught in, for example, "Polymer Handbook, Chapter 4" compiled by J. Brandrup et al and published by John Wiley & Sons, Inc. in 1967. This solubility parameter is also closely concerned with the intensity of the hydrogen bond of a thermoplastic resin, and in general, thermoplastic polymers having on the main or side chain polar groups such as hydroxyl, amide, ester and nitrile groups and chlorine atoms have a relatively high solubility parameter exceeding 9.5, though the value differs to some extent depending on the content and distribution state of such polar groups.

Sp values of typical thermoplastic resins are as shown in Table 1. From Table 1, it will readily be understood that polar group-containing polymers such as polyvinyl alcohol and polyacrylonitrile have a high solubility parameter. However, these polymers are not melt-extrudable. Accordingly, these polymers must be used after they are modified so that they can be melt-extruded.

TABLE 1

| Sp Values [(cal/cc)$^{\frac{1}{2}}$] of Thermoplastic Resins | |
|---|---|
| Resin | Sp Value |
| polyethylene | 8.0 |
| polypropylene | 7.9 |
| polybutadiene | 8.1 |
| polystyrene | 8.56 |
| polyisobutylene | 7.8 |
| polyvinyl acetate | 9.4 |
| polyvinyl chloride | 9.53 |
| polymethyl methacrylate | 9.6 |
| polymethacrylonitrile | 10.7 |
| polyethylene terephthalate | 10.7 |
| cellulose diacetate | 10.9 |
| polyvinylidene chloride | 12.2 |
| polyhexamethylene adipamide | 13.6 |
| polyvinyl alcohol | 12.6 |
| polyacrylonitrile | 15.4 |

Solubility parameters (Sp values) of copolymers can be approximately obtained from arithmetic means of solubility parameters of homopolymers of respective monomers constituting the copolymers. For example, approximate Sp values of ethylene-vinyl alcohol copolymers can be calculated according to the following formula:

$$Sp = E_{sp} \cdot E_M + V_{sp} \cdot V_M \quad (1)$$

wherein $E_{sp}$ stands for the Sp value of polyethylene, $E_M$ stands for the mole percent of ethylene in the copolymer, $V_{sp}$ stands for the Sp value of polyvinyl alcohol and $V_M$ stands for the mole percent of vinyl alcohol in the copolymer.

Sp values of ethylene-vinyl alcohol copolymers differing in the vinyl alcohol (VA)/ethylene (Et) ratio, which are calculated from the above formula, are well in agreement with the measured values as shown in Table 2.

TABLE 2

| VA/Et Molar Ratio | Measured Sp Value | Calculated Sp Value |
|---|---|---|
| 46/54 | 9.85–10.25 | 10.05 |
| 50/50 | 10.0–10.5 | 10.25 |

TABLE 2-continued

| VA/Et Molar Ratio | Measured Sp Value | Calculated Sp Value |
|---|---|---|
| 75/25 | 11.25–11.65 | 11.45 |

Similarly, approximate Sp values of copolymers of ethylenically unsaturated nitrile monomers with comonomers can be calculated from the following formula:

$$Sp = Asp \cdot A_M + \sum_{n=1}^{m} Sp_n \cdot M_n \quad (2)$$

wherein Asp stands for the Sp value of a homopolymer of an ethylenically unsaturated nitrile, $A_M$ stands for the mole percent of the ethylenically unsaturated monomer in the copolymer, $Sp_n$ stands for the Sp value of a homopolymer of the comonomer, $M_n$ stands for the mole percent of the monomer in the copolymer, and m is a number of at least 1 which corresponds to the number of kinds of comonomers contained in the copolymer.

Sp Values of commercially available polyamides are in the range of from 9.5 to 13.6 as shown in Table 3.

TABLE 3

| Polyamide | Sp Value |
|---|---|
| Polylauryllactam (nylon 12) | 9.5 |
| Polyundecanamide (nylon 11) | 9.9 |
| Polycaprolactam (nylon 6) | 12.7 |
| Polyhexamethylene-sebacamide (nylon 6-10) | 12.5 |
| Polyhexamethylene-adipamide (nylon 6-6) | 13.6 |
| Caprolactam/hexamethylene diammonium[1] adipate copolymer | 12.8 |

[1]Nylon 6/nylon 6-6 copolymer (caprolactam content is 91 mole %)

In the present invention, in order to attain a good plastic processability, e.g., a good adaptability to biaxial draw molding, and a high gas barrier property, it is important that a plurality of melt-extrudable thermoplastic polymers, each of which has an Sp value of at least 9.5, are chosen and combined so that at least one of the thermoplastic polymers has an oxygen permeability lower than $5 \times 10^{-11}$ cc·cm/cm$^2$·sec·cmHg (as measured at a temperature of 37° C. and a relative humidity of 0%) and the difference of the solubility parameter ($\Delta$Sp value) in the thermoplastic resins is not greater than 4.5. It is preferred that the oxygen permeability of each of the thermoplastic resins chosen and used be lower than $5 \times 10^{-11}$ cc·cm/cm$^2$·sec·cmHg.

Oxygen permeabilities of typical thermoplastic resins are shown in Table 4.

TABLE 4

| Oxygen Permeabilities (PO$_2$) of Various Resins | |
|---|---|
| Resin | PO$_2 \times 10^{11}$ (cc · cm/ cm$^2$ · sec · cmHg) (at 37° C. and 0% RH) |
| low density polyethylene (d = 0.922 g/cc) | 105 |
| medium density polyethylene (d = 0.935 g/cc) | 56 |
| high density polyethylene (d = 0.955 g/cc) | 29 |
| polystyrene (atactic) | 125 |
| ethylene/vinyl acetate copolymer (vinyl acetate content = 17% by weight) | 137 |
| Surlyn ® -A (ionomer manufactured by Du Pont; acid content = 3.5 mole %; Na+ type) | 96 |
| polypropylene (isotactic, undrawn) | 51 |
| polypropylene (isotactic, biaxially drawn) | 19 |
| polyvinyl chloride (undrawn) | 1.7 |
| polyvinyl chloride (biaxially drawn) | 0.75 |
| vinylidene chloride/vinyl chloride copolymer (vinyl chloride content = 12% by weight; undrawn) | 1.3 |
| vinylidene chloride/vinyl chloride copolymer (vinyl chloride content = 12% by weight; biaxially stretched) | 0.52 |
| XT ® polymer (polymethyl methacrylate resin manufactured by American Cyanamid) | 4.3 |
| high nitrile resin (1) [AN*—Bu** + MMA***] (grafted); butyl rubber incorporated] | 0.50 |
| high nitrile resin (2) [AN*—Bu** + vinyl ether (grafted); butyl rubber incorporated] | 0.47 |
| Cycopac ® 930 (acrylonitrile resin manufactured by Borg-Warner) | 0.29 |
| ABS resin | 4.9 |
| polycarbonate | 47 |
| polyethylene terephthalate (undrawn) | 4.0 |
| polyethylene terephthalate (biaxially drawn) | 2.2 |
| nylon 6/nylon 6-6 copolymer (undrawn) | 0.33 |
| nylon 6/nylon 6-6 copolymer (biaxially drawn) | 0.80 |
| nylon 6 (undrawn) | 0.32 |
| nylon 6 (biaxially drawn) | 0.40 |
| polybutylene terephthalate (undrawn) | 3.6 |
| polybutylene terephthalate/polytetramethylene oxide block copolymer | 9.2 |
| acrylic acid-grafter ethylene/vinyl alcohol copolymer poly-4-methyl-pentene-1 (undrawn) | 10.1 |
|  | 94.0 |
| polytetrafluoroethylene | 15.7 |
| Saponified ethylene/vinyl acetate copolymer (1) (Eval ® manufactured by Kuraray; ethylene content = 25.4 mole %, saponification degree = 99.2% | 0.033 |
| saponified ethylene/vinyl acetate copolymer (12) (Eval ® manufactured by Kuraray; ethylene content = 49.5 mole %; saponification degree = 95.8%) | 0.26 |

Notes:
*: acrylonitrile
**: butadiene
***: methyl methacrylate

As will be apparent from Table 4, ethylene-vinyl alcohol copolymers (saponified ethylene-vinyl acetate copolymers) have an especially high gas impermeability among various thermoplastic resins. Accordingly, in the present invention, it is preferred that an ethylenevinyl alcohol copolymer be used as one of thermoplastic resins constituting the resin blend.

In general, it is preferred that the vinyl alcohol content of the ethylene-vinyl alcohol copolymer be in the range of from 50 to 75 mole %. In other words, it is preferred that the ethylene content be 25 to 50 mole %. When the vinyl alcohol content in the copolymer is lower than 50 mole %, the permeability to gases such as oxygen is higher than in the copolymer having the vinyl alcohol content in the above range. If the vinyl alcohol content in the copolymer exceeds 75 mole %, the hydrophilic characteristic of the copolymer is enhanced and the water vapor permeability is increased. Further, the oxygen permeability of the copolymer is greatly influenced by the humidity and the melt-moldability is degraded. Therefore, use of an ethylene-vinyl alcohol copolymer having such high vinyl alcohol content is not preferred for attaining the objects of the present invention.

These ethylene-vinyl alcohol copolymers can be obtained, for example, by saponifying a copolymer of ethylene with a lower fatty acid ester such as vinyl formate, vinyl acetate or vinyl propionate, especially an ethylene-vinyl acetate copolymer, as disclosed in the specifications of U.S. Pat. No. 3,183,203 and U.S. Pat. No. 3,419,654. The degree of saponification of the ethylene-vinyl ester copolymer has important influences on the oxygen permeability of the final molded container. In the present invention, it is preferred that the ethylene-vinyl alcohol copolymer used be a copolymer obtained by saponifying at least 96%, especially at least 99%, of the vinyl ester in the ethylene-vinyl ester copolymer. In other words, it is preferred that the amount of the remaining vinyl ester be smaller than 4 mole %, especially smaller than 1 mole %, based on the vinyl groups in the copolymer. This ethylene-vinyl alcohol copolymer may comprise as a comonomer component a copolymerizable olefin such as propylene, butene, iso-butylene or hexene-1 in an amount not having bad influences on gas permeation characteristics such as oxygen impermeability and carbon dioxide gas impermeability, for example, in an amount of up to 3 mole %.

The molecular weight of the ethylene-vinyl alcohol copolymer is not particularly critical. In general, any of ethylene-vinyl alcohol copolymers having a film-forming molecular weight can be used. The intrinsic viscosity $[\eta]$ of the ethylene-vinyl alcohol copolymer is, for example, measured with respect to a solution in a mixed solvent comprising 85% by weight of phenol and 15% by weight of water at a temperature of 30° C. In the present invention, it is preferred that the intrinsic viscosity $[\eta]$ of the ethylene-vinyl alcohol copolymer used be in the range of 0.07 to 0.17 l/g as measured according to the above method.

As another instance of the thermoplastic polymers having a high gas barrier property, which satisfies the above requirement of the solubility parameter, there can be mentioned various homopolyamides and copolyamides, and blends thereof.

As such polyamide, there can be mentioned, for example, homopolyamides and copolyamides having amide recurring units expressed by the following formula (3) or (4) and blends thereof:

or

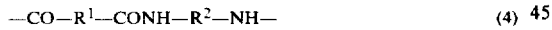

wherein R, $R^1$ and $R^2$ each stand for a linear alkylene group.

In view of the gas barrier property to oxygen, carbon dioxide gas and the like, it is preferred to use homopolyamides and copolyamides in which the number of amide groups is 3 to 30, especially 4 to 25, per 100 carbon atoms in the polyamide, and blends of these polyamides. Examples of preferred homopolyamides include polycaprolactam (nylon 6), poly-ω-aminoheptanoic acid (nylon 7), poly-ω-aminononanoic acid (nylon 9), polyundecanamide (nylon 11), polylauryllactam (nylon 12), polyethylene diamine adipamide (nylon 2-6), polytetramethylene adipamide (nylon 4-6), polyhexamethylene adipamide (nylon 6—6), polyhexamethylene sebacamide (nylon 6-10), polyhexamethylene dodecamide (nylon 6-12), polyoctamethylene adipamide (nylon 8-6), polydecamethylene adipamide (nylon 10-6) and polydodecamethylene sebacamide (nylon 10-8).

Examples of preferred copolyamides include caprolactam/lauryl lactam copolymers, caprolactam/hexamethylene diammonium adipate copolymers, lauryl lactam/hexamethylene diammonium adipate copolymers, hexamethylene diammonium adipate/hexamethylene diammonium sebacate copolymers, ethylene diammonium adipate/hexamethylene diammonium adipate copolymers and caprolactam/hexamethylene diaamonium adipate/hexamethylene diammonium sebacate copolymers.

These homopolyamides and copolyamides may be used in the form of so-called blends. For example, a blend of polycaprolactam and polyhexamethylene adipamide and a blend of polycaprolactam and a caprolactam/hexamethylene diammonium adipate can be used in the present invention.

In addition, an aromatic polyamide containing in the molecule chain at least 70 mole % of structural units derived from metaxylylene diamine or a mixed xylylene diamine containing paraxylylene diamine in an amount of up to 30% based on the mixed xylylene diamine and an α,ω-aliphatic dicarboxylic acid having 6 to 10 carbon atoms can be used in the form of a blend with an ethylene-vinyl alcohol copolymer such as mentioned above, though this aromatic polyamide is slightly inferior to the above-mentioned aliphatic polyamides with respect to the moldability.

The molecular weight of the polyamide used is not particularly critical in the present invention, and any of polyamides having a film-forming molecular weight can be used. In general, however, it is preferred that the relative viscosity ($\eta$ rel) of the polyamide be in the range of from 1.8 to 3.5 as measured with respect to a solution of 1 g of the polymer in 100 cc of 98% sulfuric acid at 20° C. A polyamide having a relative viscosity lower than 1.8 is defective is that when a blend of this polyamide with other thermoplastic resin is biaxially drawn and blow-molded, a molded article excellent in the mechanical strength can hardly be obtained. A polyamide having a relative viscosity higher than 3.5 is ordinarily insufficient in the melt-moldability.

As another instance of the thermoplastic resin valuable for formation of the resin blend that is used in the present invention, there can be mentioned aromatic polyesters, though they are inferior to the above-mentioned ethylene-vinyl alcohol copolymers and polyamides with respect to the gas impermeability as seen from Table 4. More specifically, there can be used aromatic polyesters having recurring units represented by the following formula (5) or (6):

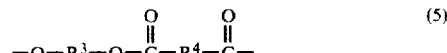

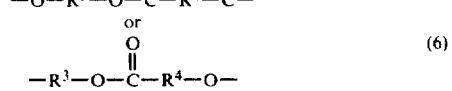

wherein $R^3$ stands for a linear alkylene group and $R^4$ stands for an aromatic hydrocarbon group. As specific examples of such aromatic polyester, there can be mentioned polyethylene terephthalate, polybutylene terephthalate, ethylene/butylene terephthalate copolymers, ethylene terephthalate/ethylene isophthalate copolymers and polyoxyethylene benzoate.

As another instance of the melt-extrudable thermoplastic polymer satisfying the foregoing requirements of Sp and $PO_2$ values, there can be mentioned so-called high nitrile thermoplastic polymers, there can be mentioned thermoplastic copolymers comprising 40 to 97 mole %, preferably 60 to 86 mole %, based on the total polymer, of a nitrile group-containing ethylenically unsaturated monomer such as acrylonitrile, methacrylonitrile or a mixture thereof with the remaining amount of at least one comonomer selected from the group consisting of conjugated diene type hydrocarbons such as butadiene and isoprene, esters of ethylenically unsaturated carboxylic acids such as methyl methacrylate and ethyl acrylate, vinyl ethers such as methyl vinyl ether, and monovinyl aromatic hydrocarbons such as styrene and vinyl toluene.

Chlorine-containing thermoplastic polymers such as polyvinyl chloride, polyvinylidene chloride, vinyl chloride-vinylidene chloride copolymers and internally plasticized vinyl chloride resins involve problems in connection with the thermal stability and melt-moldability. However, also these polymers can be used in the present invention on condition that organic tin type stabilizers, metal soap type stabilizers, known plasticizers and lubricants are appropriately incorporated in these polymers.

In accordance with one preferred embodiment of the present invention, a plurality of thermoplastic resins, each having a $PO_2$ value lower than $5 \times 10^{-11}$, especially lower than $4.3 \times 10^{-11}$, are mixed to form a blend. In this preferred embodiment of the present invention, at least two members selected from ethylenevinyl alcohol copolymers, polyamides, aromatic polyesters, high nitrile resins and chlorine-containing polymers are combined to form a blend in which the above-mentioned $\Delta Sp$ value is not greater than 4.5.

A combination of (a) an ethylene-vinyl alcohol copolymer and (b) a polyamide is most preferred as the resin combination for formation of the resin blend that is used in the present invention. This ethylenevinyl alcohol copolymer/polyamide blend has an especially good adaptability to biaxial draw molding and provides a draw-molded container especially excellent in the gas impermeability to oxygen, carbon dioxide gas and the like, the transparency, the creep resistance, the hardness and other mechanical properties. Among combinations of the above resins (a) and (b), one comprising (a) an ethylene-vinyl alcohol copolymer having an ethylene content of 25 to 50 mole % and a vinyl acetate content lower than 1 mole % and (b) a carprolactam/hexamethylene diammonium adipate copolymer having a caprolactam content of 85 to 90 mole % gives best results with respect to the above-mentioned properties.

Suitable combinations of thermoplastic polymers other than mentioned above include a combination of an ethylene-vinyl alcohol copolymer and an aromatic polyester such as mentioned above, a combination of a polyamide and an aromatic polyester, and a combination of a polyamide and a high nitrile resin.

Further, blends of three or more of the foregoing thermoplastic resins having a high gas barrier property, for example, a blend of an ethylene-vinyl alcohol copolymer, a polyamide and a high nitrile resin and a blend of an ethylene-vinyl alcohol copolymer, a polyamide and an aromatic polyester, can be used in the present invention.

In accordance with another embodiment of the present invention, a blend of (A) a thermoplastic resin having a $PO_2$ value lower than $5 \times 10^{-11}$ and (B) a thermoplastic resin having a $PO_2$ value not lower than $5 \times 10^{-11}$ and a solubility parameter (Sp) of at least 9.5 is used as the resin blend.

As the thermoplastic resin (A), various thermoplastic resins mentioned above can be used, and as the thermoplastic resin (B), there can be employed, for example, acrylic resins such as polymethyl methacrylate and polyethyl acrylate, and polycarbonate resins (Sp value = 10.1).

In the present invention, it is important that a plurality of thermoplastic resins are blended at such a mixing ratio that the elongation of the resulting resin blend is higher than the arithmetic mean ($\bar{\epsilon}$) of elongations of the respective thermoplastic resins. In the instant specification and claims, the elongation ($\epsilon$) is defined as a value represented by the following formula:

$$\epsilon = 100 \left( \frac{Lt - Lo}{Lo} \right) \tag{7}$$

wherein Lt denotes the breakage length in a parison, sheet or film in the direction where breakage first occurs, between the extrusion direction and the direction rectangular thereto, and Lo designates the original length in the direction where breakage first occurs.

The arithmetric mean ($\bar{\epsilon}$) of elongations is defined as a value expressed by the following formula:

$$\bar{\epsilon} = \epsilon_1 \cdot \chi_1 + \epsilon_2 \cdot \chi_2 + \ldots + \epsilon_m \cdot \chi_m = \sum_{n=1}^{m} \epsilon_n \cdot \chi_n \tag{8}$$

wherein $\epsilon_n$ stands for the elongation of a sheet formed by extrusion-molding solely the individual thermoplastic resin contained in the blend, $\chi_n$ stands for the weight percent of said individual resin in the blend, and m is a number of at least 2 which represents the number of kinds of thermoplastic resins contained in the blend.

In the present invention, a plurality of thermoplastic resins are blended at such a mixing ratio that the elongation of the resulting blend is higher than the arithmetic mean ($\bar{\epsilon}$) calculated according to the above formula (8).

From results shown in Table 8 in Example 2 given hereinafter and FIG. 1 of the accompanying drawings, it will readily be understood that when a plurality of thermoplastic resins are combined according to the present invention so that the foregoing requirements are satisfied, the draw moldability can be unexpectedly highly improved. More specifically, when an undrawn sheet formed from an ethylene-vinyl alcohol copolymer and an undrawn sheet formed from a nylon 6/nylon 6-6 copolyamide are simultaneously biaxially drawn at a temperature of 120° C. and a drawing speed of 30 cm/min, they exhibit elongations of 25% and 130%, respectively. In contrast, when a sheet is prepared from a blend comprising the above ethylene-vinyl alcohol copolymer and the above copolyamide at a specific ratio and the sheet is biaxially drawn under the same conditions, the sheet has an elongation (indicated by a solid line in FIG. 1) much higher than the arithmetic mean ($\bar{\epsilon}$) of the elongations of the two resins (indicated by a dot line in FIG. 1), and in case of a blend in which the copolyamide/ethylene-vinyl alcohol copolymer weight ratio is 60/40, an extraordinarily high elongation, 230%, can be obtained. Therefore, according to the present invention, even in case of a thermoplastic resin having a low adaptability to biaxial drawing, if it is blended with one or more of other thermoplastic resins so that the above requirements are satisfied, the poor biaxial draw-moldability can be remarkably improved.

The reason why the biaxial draw-moldability is remarkably improved in the present invention has not been completely elucidated. However, in view of the fact that each of thermoplastic resins used in the present invention has polar groups forming strong hydrogen bonds in the polymer chain as seen from its high solubility parameter and the fact that each of these thermoplastic resins is soluble in solvents having a high polarity, it is construed tht it may be one of causes of such remarkable improvement of the biaxial draw-moldability that a plurality of thermoplastic resins in the blend have an action of plasticizing one another.

In the present invention, also the gas barrier property can be remarkably improved by drawing a blend comprising a plurality of thermoplastic resins. This will readily be understood from results shown in Table 8 in Example 2 given hereinafter.

The mixing ratio of a plurality of thermoplastic resins in the blend that is used in the present invention is considerably changed depending on the kinds of the resins and the draw ratio adopted at the molding step for obtaining the intended draw-molded container. In the present invention, however, it generally is preferred that (A) a resin having a lower oxygen permeability, for example, an ethylene-vinyl alcohol, and (B) a resin having a higher oxygen permeability, for example, a polyamide or polyester, be mixed at a mixing weight ratio of (A):(B) ranging from 90:10 to 10:90, especially from 80:20 to 20:80, so that the elongation of the blend is much higher than the arithmetric mean ($\bar{\epsilon}$) of the elongations of the resins (A) and (B).

One or more of polymers having a solubility parameter lower than 9.5 may be incorporated in the blend that is used for formation of draw-molded containers in the present invention in such an amount as will not degrade the biaxial draw-moldability or the gas barrier property, in general, in an amount of up to 40% by weight. As such polymer, there can be mentioned, for example, polyolefins such as low density polyethylene, medium density polyethylene, high density polyethylene and ethylene-propylene copolymers, elastomers such as ethylene-butadiene rubbers, ethylene-propylene-diene rubbers, polybutadiene, butadiene-styrene rubbers, butadiene-acrylonitrile rubbers, polyisoprene and polyisobutylene, ethylene-vinyl acetate copolymers, and ionomers.

In the present invention, the above-mentioned blend may be molded into a parison, sheet or film in the form of a single layer or may be used in the form of a multiple layer for formation of a parison, sheet or film.

MULTI-LAYER STRUCTURE

In accordance with another preferred embodiment of the present invention, a multi-layer draw-molded article having an interlaminar bonding strength of at least 20 g/cm and having a highly improved gas barrier property, is formed from a parison, sheet or film having a multi-layer structure including at least one layer of the above-mentioned blend and at least one layer of a thermoplastic resin having a moisture permeability lower than $100 \times 10^{-12}$ g·cm/cm$^2$·sec·cmHg as measured at a temperature lower than 50° C.

If the water vapor permeability of the abovementioned blend is high or the permeability of oxygen or other gas is increased in a high humidity atmosphere, it is necessary to protect a layer of the blend with a resin having a low water vapor permeability. For example, if a material to be packaged by a container is a dry product, it is necessary to protect the blend on the outside of the container, namely from the outer atmosphere, and in the case where a content to be packaged is a liquid or contains water, it is necessary to protect the blend on both the outside and inside of the container, namely from the outer atmosphere and from the content. In accordance with this preferred embodiment of the present invention, the high gas barrier property of the blend can be further improved by laminating on the blend a layer of a thermoplastic resin having a water vapor permeability lower than $100 \times 10^{-12}$ g·/cm/c-m$^2$·sec·cmHg.

For reference, values of the water vapor permeabilities of various thermoplastic resins are shown in Table 5.

TABLE 5

Water Vapor Permeabilities (PH$_2$O) of Various Resins

| Resin | PH$_2$O × 10$^{12}$ (g · cm/cm$^2$ · sec · cmHg) (as measured at 25° C. and 90% RH) |
|---|---|
| low density polyethylene (d = 0.922 g/cc) | 7.2 |
| medium density polyethylene (d = 0.938 g/cc) | 2.0 |
| high density polyethylene (d = 0.954 g/cc) | 1.4 |
| acid-modified polyethylene (Admer ® manufactured by Mitsui Petrochemical) | 4.0 |
| acid-modified polypropylene (Admer ® manufactured by Mitsui Petrochemical) | 6.5 |
| polypropylene (isotactic, undrawn) | 4.1 |
| polypropylene (isotactic, biaxially drawn) | 1.9 |
| polystyrene (atactic) | 89 |
| ethylene-vinyl acetate copolymer (vinyl acetate content = 17% by weight) | 15 |
| Surlyn ®-A (ionomer manufactured by Du Pont; acid content = 3.5 mole %; Na$^+$ type) | 10–14 |
| polybutene-1 | 7.1 |
| polypentene-1 | 15 |
| poly-4-methylpentene-1 | 61–98 |
| polyvinyl chloride | 30 |
| vinylidene chloride-vinyl chloride copolymer (Dow Chemical) | 2.0 |
| Cycopac ®-930 (acrylonitrile resin manufactured by Borg-Warner) | 90 |
| polymethyl methacrylate | 110 |
| polyethylene terephthalate (undrawn) | 12 |
| polyethylene terephthalate (biaxially drawn) | 9.0 |
| polybutylene terephthalate | 9.2 |
| polycarbonate | 120 |
| polytetrafluoroethylene | 2.6 |
| polytrifluoroethylene | 0.023 |
| polyoxymethylene | 76 |
| SM resin (poly-p-xylylene adipamide resin manufactured by Toyobo) | 51 |
| nylon 6 | 356 |
| nylon 6-6 | 54.4 |
| nylon 6/nylon 6-6 copolyamide | 320 |
| saponified ethylene-vinyl acetate copolymer (Eval ® manufactured by Kuraray; ethylene content = 25.4 mole %; saponification degree = 99.2%) | 150 |

The bonding strength of a multi-layer sheet or film tends to be considerably lowered by plastic processing. The reason is considered to be that different stresses are caused on interfaces of respective layers depending on viscoelastic properties or resins of the respective layers during draw-molding and these stresses often exert actions of peeling off the interfaces. In cups formed by heat molding the above-mentioned laminated sheet or film, from the practical viewpoint, it is necessary that the T peel strength (bonding strength) must be higher than 70 g/cm; otherwise, the cups cannot pass the practical falling test and the like. The bonding strength of cups prepared by draw-forming, described hereinafter, of the same laminated sheet or film is lower than the bonding strength of cups prepared by heat molding for the above-mentioned reason. However, it was found that in case of cups prepared by draw-forming, if the bonding strength is at least 20 g/cm, they have a practically sufficient strength and they can pass the practical falling test. The reason has not yet been completely elucidated, but it is construed that since viscoelastic properties of the resins of the outer and inner layers are remarkably improved and, for example, the modulus of elasticity is remarkably increased, the degree of deformation given by the same stress is much reduced, and even when falling or shaking forces are imposed on cups, the component of the force applied vertically to the interfaces of the laminated layers, namely the peeling force, is reduced. Data are detailed in Example 11 given hereinafter.

As the resin constituting the moisture-resistant layer, there are preferably employed polyolefins such as low density polyethylene, medium density polyethylene, high density polyethylene, polypropylene, ethylene-propylene copolymers, polybutene-1, polypentene-1 and poly-4-methylpentene-1, and copolymers of olefins with carbonyl group-containing ethylenically unsaturated monomers, such as ethylene-vinyl acetate copolymers, ionomers, ethylene-acrylic acid ester copolymers, maleic acid-modified polypropylene and acrylic acid-grafted polyethylene. In these copolymers, it is preferred that the carbonyl group concentration be in the range of from 120 to 800 meq/100 g of the polymer. In addition to the foregoing olefins and olefin/carbonyl group-containing monomer copolymers, there can be used polyfluoroethylene type resins such as polytrifluoroethylene and polytetrafluoroethylene as the moisture resistant layer-constituting resin, though they are insufficient to some extent with respect to the moldability.

In accordance with still another embodiment of the present invention, a multi-layer draw-molded container having a much improved creep resistance is prepared from a parison (pipe), sheet or film having a multi-layer structure including at least one layer of the above-mentioned blend and at least one layer composed of a thermoplastic resin in which the sum of the instantaneous modulus (Eg) and retardation modulus ($E_1$) at a temperature of 23° C. and a stress of $7 \times 10^7$ dyne/cm$^2$ is at least $1 \times 10^{10}$ dyne/cm$^2$ and which has a steady state flow viscosity ($\eta_\infty$) of at least $1 \times 10^{17}$ poise and a retardation time ($t_R$) shorter than $6 \times 10^6$ sec, wherein the interlaminar bonding strength is at least 20 g/cm.

In general, when a stress S is imposed on a viscoelastomer such as a thermoplastic polymer for a time t, if the time t is short, the viscoelastomer behaves as an elastomer and if the time t is increased, influences by viscosity are manifested as well as influences of elasticity and the system takes a viscoelastic behavior. If the value of the time t is sufficiently large, viscous flow is generated. These viscoelastic characteristics can be illustratively expressed by the above factors as Eg, $E_1$, $\eta_\infty$ and $t_R$.

When molded containers are used as pressure-resistant containers such as containers for carbonated drinks or aerosol containers, materials constituting the container walls are required to have not only an excellent gas barrier property but also hardness and creep resistance sufficient to resist the pressure of the content and a high impact resistance in combination.

In accordance with the above-mentioned preferred embodiment of the present invention, a layer of a thermoplastic resin having the above-mentioned specific viscoelastic characteristics is laminated on a layer of the above-mentioned blend, whereby the creep resistance and hardness required of a pressure-resistant container can be remarkably improved over a container composed of a single layer of the blend. Moreover, the impact resistance can also be remarkably improved by adoption of this multi-layer structure.

Among the above-mentioned viscoelastic characteristics, the sum (Eg+$E_1$) of the instantaneous modulus and retardation modulus is concerned with the hardness of the vessel. In view of the pressure resistance of the container, in the present invention it is important that under conditions of a temperature of 23° C. and a stress of $7 \times 10^7$ dyne/cm$^2$, the value of (Eg+$E_1$) must be at least $1 \times 10^{10}$ dyne/cm$^2$, especially at least $2 \times 10^{10}$ dyne/cm$^2$. Further, the steady state flow viscosity ($\eta_\infty$) and the retardation time are concerned with the creep resistance. In the present invention, in order to prevent creep, it is important that $\eta_\infty$ must be at least $1 \times 10^{17}$ poise, especially at least $5 \times 10^{17}$ poise, and $t_R$ must be shorter than $6 \times 10^6$ sec, especially lower than $3 \times 10^6$ sec.

Values of viscoelastic characteristics of various thermoplastic resins are illustrated in Table 6 for reference.

TABLE 6

| | Creep Viscoelastic Parameters of Various Resins | | | | |
|---|---|---|---|---|---|
| Resin | Temperature (°C.) | Stress (S × $10^{-7}$) (dyne/cm$^2$) | (Eg + $E_1$) × $10^{-10}$ (dyne/cm$^2$) | $\eta_\infty$ × $10^{-17}$ (Poise) | $t_R$ × $10^{-5}$ (sec) |
| PE (HD) | 23 | 5.2 | 1.32 | 2.27 | 6.25 |
| | 23 | 7.0 | 1.34 | 1.38 | 6.52 |
| iso-PP | 23 | 3.5 | 2.93 | 7.58 | 8.32 |
| | 23 | 7.0 | 2.64 | 6.69 | 8.67 |
| | 23 | 10.4 | 2.32 | 6.06 | 8.78 |
| FEP | 23 | 3.5 | 2.47 | 0.37 | 0.41 |
| | 23 | 7.0 | 1.29 | 0.28 | 0.42 |
| | 23 | 10.4 | 0.41 | 0.08 | 0.41 |
| PS | 23 | 11.7 | 5.72 | 18.6 | 6.96 |
| PVC | 23 | 3.5 | 8.47 | 7.58 | 0.73 |
| | 23 | 7.0 | 6.96 | 3.38 | 0.58 |
| | 23 | 10.4 | 3.24 | 0.57 | 1.50 |
| | 49 | 3.5 | 0.73 | 0.15 | 3.47 |
| HNR | 23 | 20.4 | 1.34 | 2.14 | 12.9 |
| PTFE | 23 | 4.5 | 0.67 | 13.1 | 15.8 |
| | 23 | 5.9 | 0.50 | 3.31 | 15.7 |
| | 23 | 7.0 | 0.32 | 3.44 | 25.0 |
| PCTFE | 23 | 13.8 | 7.50 | 31.0 | 1.28 |
| | 23 | 20.7 | 2.68 | 3.58 | 1.27 |

TABLE 6-continued

Creep Viscoelastic Parameters of Various Resins

| Resin | Temperature (°C.) | Stress (S × $10^{-7}$) (dyne/cm$^2$) | (Eg + E$_1$) × $10^{-10}$ (dyne/cm$^2$) | $\eta_\infty$ × $10^{-17}$ (Poise) | $t_R$ × $10^{-5}$ (sec) |
|---|---|---|---|---|---|
|  | 66 | 4.8 | 1.15 | 5.79 | 19.1 |
|  | 66 | 7.0 | 0.97 | 4.34 | 12.7 |
| ABS | 23 | 11.0 | 10.1 | 3.72 | 2.27 |
|  | 23 | 13.8 | 10.1 | 2.62 | 2.27 |
|  | 23 | 20.7 | 8.26 | 0.90 | 2.29 |
|  | 71 | 3.5 | 3.79 | 0.14 | 1.61 |
|  | 71 | 7.0 | 3.38 | 0.11 | 1.35 |
| PMMA | 23 | 10.0 | 21.4 | 96.5 | 0.63 |
|  | 23 | 20.0 | 13.1 | 75.8 | 1.60 |
|  | 23 | 30.0 | 8.69 | 75.8 | 1.08 |
|  | 60 | 5.0 | 6.34 | 17.4 | 0.52 |
| polyallyl ether | 23 | 13.8 | 8.34 | 2.20 | 4.17 |
|  | 23 | 20.7 | 5.72 | 1.86 | 2.41 |
|  | 23 | 27.6 | 5.45 | 1.52 | 2.55 |
|  | 23 | 34.4 | 5.04 | 0.41 | 1.00 |
| PET | 23 | 7.0 | 22.4 | 35.1 | 2.57 |
|  | 23 | 14.7 | 22.4 | 35.1 | 2.57 |
|  | 23 | 24.4 | 22.4 | 35.1 | 2.57 |
|  | 40 | 7.0 | 11.8 | 3.44 | 2.30 |
|  | 40 | 9.8 | 11.8 | 3.44 | 2.30 |
|  | 40 | 14.7 | 11.1 | 2.14 | 1.58 |
| polycarbonate | 23 | 13.8 | 9.58 | 75.9 | 4.00 |
|  | 23 | 20.7 | 8.61 | 65.5 | 4.12 |
|  | 80 | 13.8 | 4.20 | 43.1 | 4.36 |
|  | 80 | 20.7 | 3.86 | 1.12 | 4.57 |
| polyphenylene oxide | 23 | 7.0 | 11.0 | 68.9 | 55.0 |
|  | 23 | 13.8 | 12.1 | 60.6 | 23.5 |
|  | 23 | 20.7 | 8.90 | 60.6 | 19.2 |
|  | 66 | 7.0 | 8.20 | 21.4 | 7.11 |
|  | 66 | 13.8 | 5.04 | 19.7 | 8.15 |
|  | 66 | 20.7 | 4.55 | 3.10 | 2.70 |
| polyacetal | 23 | 3.5 | 6.69 | 25.5 | 25.0 |
|  | 23 | 7.0 | 6.69 | 25.5 | 25.0 |
|  | 23 | 10.4 | 6.62 | 25.5 | 25.0 |
|  | 60 | 3.5 | 3.10 | 4.96 | 26.0 |
|  | 60 | 7.0 | 3.10 | 4.96 | 26.0 |
|  | 60 | 13.8 | 2.48 | 2.16 | 42.0 |
| nylon 6-6 | 23 | 10.4 | 21.6 | 10.3 | 6.30 |
|  | 23 | 20.7 | 25.6 | 8.96 | 6.12 |
|  | 23 | 41.3 | 35.7 | 3.44 | 6.04 |
| nylon 6 | 60 | 10.4 | 2.07 | 0.99 | 2.63 |

Abbreviations used in Table 6 having the following meanings:
- PE(HD): high density polyethylene
- iso-PP: isotactic polypropylene
- FEP: tetrafluoroethylene-hexafluoroethylene copolymer
- PS: polystyrene
- PVC: polyvinyl chloride
- HNR: acrylonitrile-styrene-butadiene resin having an acrylonitrile content of 62 mole %
- PTFE: polytetrafluoroethylene
- PCTFE: polychlorotrifluoroethylene
- ABS: acrylonitrile-butadiene-styrene copolymer having a styrene content of 51 mole %
- PMMA: polymethyl methacrylate
- PET: polyethylene terephthalate Among thermoplastic resins exemplified in Table 6, those having viscoelastic parameters within the ranges defined in the present invention are used as the creep-resistant thermoplastic resin. More specifically, there can be mentioned, in the order of importance, polyethylene terephthalate, polybutylene terephthalate, polycarbonate, ABS resin, polyacetal, nylons, polymethyl methacrylate, isotactic polypropylene and polystyrene.

When the container of this embodiment is used as a pressure-resistant container, it is preferred that a thermoplastic resin having reduced dependencies of the above-mentioned viscoelastic parameters on the pressure and temperature be used as the creep-resistant layer-constituting resin. For example, polyethylene terephthalate, polycarbonate, isotactic polypropylene and polystyrene are preferably emplored.

In the present invention, various bonding and laminating methods can be adopted for formation of a multilayer structure including a blend layer excellent in the gas impermeability and a layer of a thermoplastic resin excellent in the moisture resistance or the creep resistance. For example, when the blend layer contains a thermoplastic resin having carbonyl groups on the main or side chain, such as a polyamide, since the blend has, in general, a high hot-adhesiveness to a thermoplastic resin excellent in the moisture resistance or the creep resistance, a laminate structure can be formed by co-melt-extrusion without using particular bonding means. When a carbonyl group-containing thermoplastic polymer is not contained in the blend layer or the moisture-resistant or creep-resistant layer or when it is intended to further improve the interlaminar peel strength even if such carbonyl group-containing layer is contained, it is preferred to incorporate in one or both of the adjacent blend layer and moisture-resistant or creep-resistant layer a polymer containing carbonyl groups derived from functional groups of a free carboxylic acid, a carboxylic acid salt, a carboxylic acid ester, a carboxylic acid amide, a carboxylic acid anhydride, a carbonic acid ester, urethane or urea at a concentration of 120 to 1400 meq, especially 130 to 1200 meq, per 100 g of the polymer, in an amount of 0.5 to 15 parts by weight per 100 parts by weight of the resin blend or the moisture-resistant or creep-resistant thermoplastic resin.

Examples of such carbonyl group-containing polymer are illustrated in detail in Japanese Patent Application Laid-Open Specification No. 39678/74. Among these carbonyl group-containing polymers, there are preferably employed an ionomer (Surlyn ®-A manufactured by Du Pont), maleic anhydride-modified polypropylene, an ethylene-acrylic acid ester copolymer and a polyalkylene oxidepolyester block copolymer.

Optional multi-layer structures can be adopted in the container of the present invention, so far as the blend layer and the moisture-resistant or creep-resistant layer are located adjacently to each other. Examples of such multi-layer structures are as follows:

(1) Two-Layer Structure:

Blend layer/moisture-resistant or creep-resistant resin layer (2) Symmetric Three-layer Structure:

Moisture-resistant or creep-resistant resin layer/blend layer/moisture-resistant or creep-resistant layer, and blend layer/moisture-resistant or creep-resistant layer/blend layer Instead of incorporation of a carbonyl group-containing polymer into one or both of the adjacent blend and moisture-resistant or creep-resistant resin layer, there may be adopted a technique according to which an adhesive layer composed of such carbonyl group-containing layer is intervened between the blend layer and the moisture-resistant or creep-resistant layer. In this case, the following multi-layer structures can be formed:

(3) Asymmetric Three-Layer Structure:

Moisture-resistant or creep-resistant resin layer/carbonyl group-containing polymer adhesive layer/blend layer (4) Symmetric Five-Layer Structure:

Moisture-resistant or creep-resistant resin layer/carbonyl group-containing polymer adhesive layer/blend layer/carbonyl group-containing polymer adhesive layer/moisture-resistant or creep-resistant resin layer.

In the foregoing multi-layer structures, it is preferred that the thickness of the blend layer be 80 to 0.5%, especially, 50 to 2%, of the total thickness.

MOLDING METHODS

Plastic containers of the present invention can be prepared according to optional known molding methods except that the above-mentioned blend or a multi-layer structure of a layer of the blend and a layer of the creep-resistant or moisture-resistant thermoplastic resin is formed into a parison (tube), sheet or film. For example, a parison that is used for the biaxial draw-blow molding can be prepared by any of known means such as extrusion molding or injection molding.

For example, the resin blend is extrusion-molded into a pipe and the pipe is cut in a prescribed length. This cut pipe is formed in a mouthed and bottomed parison 1 as shown in FIG. 2 by using a suitable mold such as a split mold. Referring now to FIG. 2, this parison 1 comprises a cylinder 4 having one end 2 opened and the other end 2' closed to form a bottom. A lid clamping mechanism such as a bead 3 or male screw thread 5 is formed integrally with the cylinder 4 on the open end 2 or in the vicinity thereof. The molding temperature for forming the parison is not particularly critical so far as the temperature is higher than the softening point of the resin. In general, it is preferred that the temperature be selected within a range of from 180° to 350° C. so that the end portion of the pipe is completely fusion-bonded.

A mounted and bottomed parison 1 may be prepared by injection molding using an openable and closable mold having a cavity as shown in FIG. 2 without forming a parison in advance by extrusion molding.

Conditions for extrusion molding or injection molding are not particularly critical. For example, in case of a blow-molded structure having a single layer of the above-mentioned blend, a dry blend of a plurality of thermoplastic resins or a kneaded compound of a plurality of thermoplastic resins is heated in a cylinder ordinarily at 180° to 350° C. and is extruded through a die or injected through a nozzle in a mold. The extrusion pressure is changed depending on the kinds and combinations of the resins or on the size of an extruder. In general, it is preferred to adopt an extrusion pressure of 2 to 700 Kg/cm$^2$. In case of injection molding, the extrusion pressure is changed depending on the kinds and combinations of the resins or on the size of the injector or mold, but in general, a pressure of 5 to 1000 Kg/cm$^2$ may be used. A Dulmage screw or a metering screw can be used as the extruder, and a cross-head type or spider type die customarily used for extrusion of pipes or parisons of a single layer of multi-layer structure can be used as the die. An injection molding machine having in a cylinder a plunger provided with a screw for preliminary plasticization or an injection molding machine including preliminary plasticization means by a cylinder or a screw can be used. A straight-hydraulic mold or toggle mold can be used.

The above-mentioned blend and moisture-resistant or creep-resistant thermoplastic resin are co-extruded in the form of a multi-layer structure by using extruders in a number corresponding to the number of resin layers to be extruded, for example, an extruder for the blend, an extruder for the moisture-resistant or creep-resistant resin and an extruder for the carbonyl group-containing polymer adhesive, and respective resin flows are extruded through a multiple die to form a parison having a multi-layer structure. Also in case of injection molding of a multi-layer structure, injection molding machines in a number corresponding to the number of resin layers are used, and a plurality of resin flows are injected in the cavity of a mold through a composite nozzle.

A mouthed and bottomed parison formed by such extrusion molding or injection molding is drawn in a split mold in the axial direction of the parison and simultaneously or successively drawn in a direction rectangular to the axial direction by blowing a fluid into the parison.

For example, as shown in FIG. 3 illustrating one embodiment of the process for preparing blow-molded containers of the present invention, a parison 1 is supported by a mandrel 9 and a holding member 10 and fed into a cavity 7 defined by openable and closable parts 6,6 of a split mold. The mold parts 6,6 are closed to hold a beaded mouth portion 3 of the parison 1. The paired mandrel 9 and holding member 10 and the mold parts 6,6 move relatively to each other in the vertical direction to draw the parison 1 in the axial direction thereof. Simultaneously, a fluid is blown into the parison 1 from a fluid blow-in opening 8 formed on the mandrel 9 to draw the parison in a direction normal to the axial direction thereof. Thus, the parison is molded into a form of a bottle. When a fluid is blown from the opening 8 while moving the mandrel 9 and the split mold 6 relatively to each other, as shown in FIG. 3, the parison is drawn biaxially simultaneously. When a fluid is blown into the parison 1 from the blow-in opening 8 formed on the mandrel 9 or other needle after completion of the relative movement of the mandrel 9 and the split mold 6, so-called successive biaxial drawing is accomplished. A continuous pipe can be used for biaxial draw-blow molding instead of a preformed mouthed and bottomed parison. In this case, prior to drawing, the pipe is engaged with a neck finish portion of the mold 6 to form a mouth portion, and formation of a parison bottom by fusion bonding and holding of the resulting parison are performed by the holding member 10.

For example, a molding process as disclosed in Japanese Patent Publication No. 25478/69 can be used appropriately according to the kinds and combinations of resins. Further, there may be adopted a molding process in which both the ends of a bottomless resin pipe (parison) are clipped by clamps, the pipe is drawn in the longitudinal direction, the pipe is then gripped by a blowing mold, a fluid is introduced from one end of the pipe to inflate the pipe and the bottom portion is formed by fusion bonding simultaneously with blow molding.

Conditions for biaxial draw-blow molding are changed depending on the composition of the resin blend used and on other factors. In general, when parison-constituting resins are crystalline, draw-blow molding can be performed at a temperature between the crystallization temperature and the melting point, and when parison-constituting resins are amorphous, draw-blow molding can be performed at a temperature between the glass transition point and the crystallization initiating temperature or flow initiating temperature. For example, in case of relatively highly crystalline resins such as polypropylene and poly-4-methylpentene-1, draw-blow molding is carried out at a temperature lower than the melting point of the resin. In case of relatively lowly crystalline resins such as polyethylene terephthalate, ethylene terephthalate-ethylene isophthalate copolymers and polybutylene terephthalate, draw-blow molding is carried out at a temperature higher than the glass transition temperature but lower than the crystallization initiating temperature of the resin. Further, in case of amorphous or extremely lowly crystalline resins such as polyvinyl chloride, polyvinylidene chloride, acrylonitrile-styrene copolymers and acrylonitrile-styrene-butadiene copolymers, draw-blow molding is carried out at a temperature between the glass transition temperature and flow initiating temperature of the resin. In case of resins having a relatively high crystallization rate, such as polypropylene, polybutylene terephthalate and polyethylene terephthalate, if draw-blow molding is carried out under the above-mentioned temperature conditions after cooling a parison violently at a temperature lowering rate of 1° to 5000° C. per minute, preferably 5° to 1200° C. per minute, the transparency of the molded article can be remarkably improved. Needless to say, when the resin blend or multi-layer parison shows thermal behaviors inherent of respective resins, it is necessary to determine the temperature conditions based on a resin having a higher crystallization temperature or glass transition point.

The drawability of a parison of the blend of the present invention or a parison having a multi-layer structure including a layer of the blend and a layer of the moisture-resistant or creep-resistant thermoplastic resin can be determined by measuring load-elongation curves of the parison at respective temperatures. More specifically, the lower limit of the temperature range for draw-blow molding can easily be determined as a lowest temperature at which necking is not caused in a sample cut from the parison.

The effect of biaxial drawing in the axial direction of a parison and a direction rectangular is evaluated based on the thermal shrinkability ($\delta$) of the drawn sample which is calculated according to the following formula after the drawn sample has been allowed to stand in an atmosphere maintained at 50° to 150° C. for 10 to 15 minutes:

$$\delta = 100 \times \left( \frac{Ls - Le}{Ls} \right) \qquad (9)$$

wherein Ls designates the length of the draw-blow molded sample and Le stands for the equilibrium length after the above shrinkage treatment. Namely, if the value of the thermal shrinkability ($\delta$) of the drawn sample is at least 5%, preferably at least 7%, it can be said that the creep resistance, hardness and transparency are improved by drawing and orientation, though this value differs to some extent depending on the composition of the blend.

In general, in order to attain a sufficient drawing effect, it is preferred that the draw ratio in the axial direction of a parison be 1.1 to 5.0, especially 1.2 to 3.5, and that the draw ratio in the direction rectangular to the axial direction be 1.5 to 7.5, especially 2.0 to 6.0.

The drawing speed is changed depending on the kinds of resins and the drawing is carried out at such a speed that the above-mentioned improvements can be attained by the drawing. In general, it is preferred that the drawing be performed at a speed of 10% per minute to 6000000% per minute.

As the fluid to be blown into a parison through a mandrel or needle, there can be used air, nitrogen, carbon dioxide gas, steam and mixtures thereof. It is preferred that the pressure of the fluid be in the range of from 3 to 30 Kg/cm² (gauge).

A sheet or film to be used for plastic processing can be prepared by optional means, for example, a molding method using a T die and an inflation molding method.

Conditions for molding of such sheet or film are not particularly critical. For example, a molded structure comprising a single layer of the blend of the present invention is prepared by heating a dry blend or preliminarily kneaded compound of a plurality of thermoplastic resins in a cylinder ordinarily maintained at 180° to 350° C. and extruding the melt through a T die or a tubular die for inflation molding of films in the form of a sheet or film. The extrusion pressure is changed depending on the kinds and combinations of the resins or the size of an extruder, but in general, it is preferred that extrusion be carried out under a pressure of 2 to 1000 Kg/cm². A Dulmage screw or metering screw can be used as the extruder. Dies customarily used for molding of sheets, for example, a fish tail die, a manifold die (T die) and a screw die, can be used, and a T die or inflation die can be used for formation of films. Further, the above-mentioned resin blend can be formed into a sheet or film according to an injection molding method, a heat-compression molding method or a roll molding method.

When the above-mentioned resin blend is coextruded with the above-mentioned moisture-resistant or creep-resistant thermoplastic resin to form a multi-layer sheet or film, means mentioned above with respect to extrusion molding or injection molding of multi-layer parisons can be adopted. In case of the heat-compression molding method, if the blend is used for formation of an intermediate layer and the moisture-resistant resin is used for formation of outer and inner layers, prescribed amounts of the resins are filled in a mold in an order of the moisture-resistant resin, the resin blend and the moisture-resistant resin, the resins are then heated at an appropriate temperature for an appropriate time and they are compressed to obtain a multi-layer structure having a form of a sheet or film.

Plastic processing of the so formed sheet or film composed of a single layer of the blend or having a multi-layer structure including a layer of the blend and a layer of the moisture-resistant or creep-resistant resin can be performed under conditions described hereinbefore with respect to biaxial draw-blow molding of parisons. In general, it is preferred that the sheet or film be drawn at a draw ratio of 1.1 to 20, especially 1.5 to 5.

An embodiment of plastic processing of a film or sheet composed of a single layer of the blend or having a multi-layer structure including a layer of the blend and a layer of the moisture-resistant or creep-resistant resin will now be described by reference to FIGS. 4 to 7.

Figure 4:
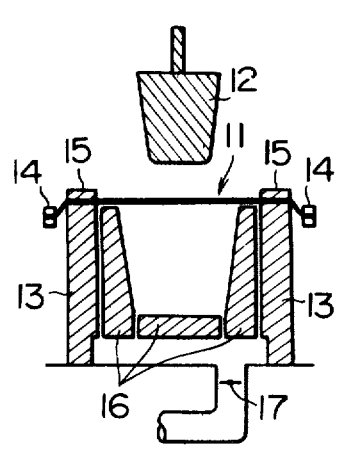
Figure 5:
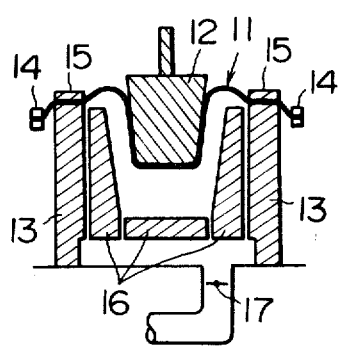
Figure 6:
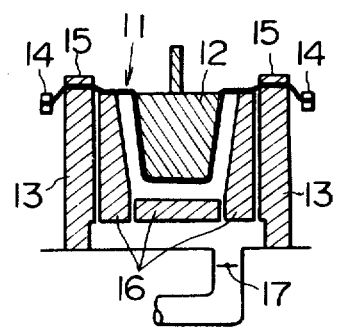
Figure 7:
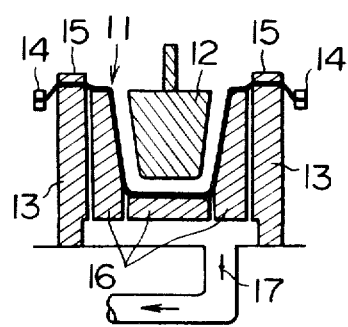

Referring to FIG. 4, a sheet or film 11 is heated at a prescribed temperature and clamped by a chamber 13 and clamps 14 and 15. Then, as shown in FIGS. 5 and 6, the sheet or film 11 is pushed into a female mold 16 to a prescribed depth by means of a plug 7. Then, as shown in FIG. 7, vacuum valve 17 is opened to effect vacuum suction and cause the sheet or film 11 to adhere closely to the inner face of the mold 16. This molding method is frequently used for forming containers from thin sheets and is ordinarily called "plug assist molding method".

In addition to the above-mentioned vacuum molding method, there can be adopted an air-pressure forming method, a sheet blow molding method, a draw molding method, a draw-ironing molding method, a compression molding method, and other special high-energy molding methods such as a forward, backward or forward-backward extrusion method using a thick sheet and an explosive forming method.

Further, a pouch-like or bag-like container can be obtained by drawing the above-mentioned sheet or film biaxially according to known means to form a biaxially drawn film and bonding and facing side edge portions of the films. For bonding such biaxially drawn film, an epoxy type or isocyanate type adhesive may be used. In the case where the moisture-resistant or creep-resistant resin layer formed as the innermost layer is composed of a heat-sealable resin, for example, polyethylene or polypropylene, the facing side edge portions of the biaxially drawn film can be bonded by heat sealing.

MOLDED STRUCTURE FORMED BY PLASTIC PROCESSING

According to the present invention, by using a combination of a plurality of thermoplastic resins satisfying the foregoing various requirements, preferably an ethylene-vinyl alcohol copolymer and a polyamide, for molding of a parison, sheet or film, it is possible to perform biaxial draw molding which is impossible or difficult when the resins are used singly, and it also is possible to enhance the draw ratio at the molding step.

According to the present invention, since the draw ratio is thus enhanced remarkably, it is possible to highly improve properties of resulting molded articles such as containers, for example, creep resistance, mechanical strength and hardness. As a result, it becomes possible to reduce the thickness and weight in containers and to reduce the quantities of resins used. Moreover, since the resin blend used is excellent in the gas impermeability and this excellent gas impermeability is enhanced by biaxial draw molding, even if the thickness of the container wall is made much smaller than in conventional gas barrier plastic containers, an excellent gas barrier property can be attained. These are prominent advantages attained by the present invention.

In the draw-molded container of the present invention, the unit volume (the volume of the container per gram of the resin) is ordinarily 0.01 to 5 dl/g, especially 0.05 to 2 dl/g, though the values differ to some extent depending on the use of the container, and the thickness of the container wall may be 0.02 to 5 mm, especially 0.05 to 3 mm. A desirable combination of a high gas barrier property with high mechanical strength, creep resistance, hardness and transparency can be attained while the unit volume and wall thickness are adjusted within the above ranges.

In the draw-molded container of the present invention, since the container is composed of a blend of a plurality of specific thermoplastic resins and it is biaxially drawn, the oxygen permeability is less than ½, especially less than ⅓, of the oxygen permeability of an undrawn container, the carbon dioxide gas permeability is less than ⅔, especially less than ½, of the carbon dioxide gas permeability of an undrawn container, and the water vapor permeability is less than ⅔, especially less than ½, of the water vapor permeability of an undrawn container, when compared based on the same thickness of the blend layer. When bubbling alcoholic drinks such as beer or carbonated refreshing drinks are contained in plastic containers, the flavor is greatly influenced even by a minute amount of oxygen permeating through the container wall. According to the present invention, the oxygen barrier property can be maintained at such a high level as mentioned above and hence, the effect of preserving these drinks can be remarkably improved. Moreover, since the container of the present invention is excellent in the carbon dioxide gas barrier property, the reduction of gas pressures of contents can be maintained at a level much lower than in conventional plastic containers.

Because of these advantages, the draw-molded container of the present invention is very useful for preserving, without substantial deterioration or quantity loss, various liquid and pasty foods and drinks, for example, bubbling alcoholic drinks such as beer, other alcoholic drinks such as Japanese sake, whisky, distilled spirits, wines, gin fizz and other cocktails, carbonated drinks such as cola, cider and plain soda, fruit drinks such as straight fruit juices, e.g., lemon juice, orange juice, plum juice, grape juice and strawberry juice and processed fruit juices, e.g., Nector ®, vegetable juices such as tomato juice, synthetic drinks and vitamin-incorporated drinks formed by blending a saccharide such as sugar or fructose, citric acid, a colorant and a perfume optionally with vitamins, lactic acid beverages, condiments such as soy, sauce, vinegar, sweet sake, dressing, mayonnaise, ketchup, soybean paste, lard and edible oil, and foods such as bean curd, jam, butter and margarine; liquid medicines, liquid agricultural chemicals, liquid cosmetics and detergents; ketones such as acetone and methylethyl ketone; aliphatic hydrocarbons such as n-hexane and n-heptane; alicyclic hydrocarbons such as cyclohexane; aromatic hydrocarbons such as benzene, toluene and xylene; chlorine-containing carbon tetrachloride, tetrachloroethane and tetrachloroethylene; liquid fuels and oils such as gasoline, kerosine, petroleum bendine, fuel oil, thinner, grease, silicone oil, light oil and machine oil; and propellants such as liquefied Freon[R] (Product of DuPont).

The present invention will now be described in detail by reference to the following Examples that by no means limit the scope of the invention.

EXAMPLE 1

Two or more resins indicated below were dry-blended at mixing weight ratios indicated in Table 7. These resin blends were blow-molded into tubes having a diameter of 40 mm and a thickness of 0.2 mm by using an extruder having a diameter of 50 mm and an effective length of 1100 mm. For comparison, respective resins were independently blow-molded into similar tubes (having a thickness of 0.2 mm). Resins used are as follows:

EV: an ethylene-vinyl alcohol copolymer having an ethylene content of 25 mole %, a vinyl acetate content of 0.5 mole % and a vinyl alcohol content of 74.5 mole % and being characterized by an Sp value of 11.3 (cal/cc)$^{\frac{1}{2}}$, an intrinsic viscosity of 0.12 l/g and melting point of 182° C. as measured according to the differential thermal analysis method (DTA method) at a temperature-elevating rate of 10° C./min N1: polycaprolactam characterized by an Sp value of 12.7 (cal/cc)$^{\frac{1}{2}}$, a relative viscosity of 1.9 and a melting point of 219° C. as measured according to the above-mentioned DTA method N2: a caprolactam/hexamethylene diammonium adipate copolymer (Nylon 6/6-6 copolymer) characterized by an Sp value of 12.8 (cal/cc)$^{\frac{1}{2}}$, a relative viscosity of 3.3, a caprolactam concentration of 91 mole % and a melting point of 193° C. as measured according to the above-mentioned DTA method PET: polyethylene terephthalate characterized by an Sp value of 10.7 (cal/cc)$^{\frac{1}{2}}$, an intrinsic viscosity of 0.10 l/g as measured at 30° C. in a 50/50 weight ratio mixed solvent of phenol and tetrachloroethane and a melting point of 256° C. as measured according to the above-mentioned DTA method AS: Cycopac[R] 930 (product of Borg-Warner Co.) having an Sp value of 11.7 (cal/cc)$^{\frac{1}{2}}$ and a glass transition point of 107° C. as measured according to the above-mentioned DTA method XT: XT[R] polymer (product of American Cyanamid Co.) having an Sp value of 9.8 (cal/cc)$^{\frac{1}{2}}$ and a glass tansition point of 102° C. as measured according to the above-mentioned DTA method Su: Surlyn[R] A (product of DuPont) (ionomer) having an Sp value of 7.9 (cal/cc)$^{\frac{1}{2}}$ and a melting point of 104° C. as measured according to the above-mentioned DTA method HD: high density polyethylene having a density of 0.95 g/cc, a melting point of 142° C. as measured according to the above-mentioned DTA method and an Sp value of 7.9 (cal/cc)$^{\frac{1}{2}}$ LD: low density polyethylene having a density of 0.92 g/cc, a melting point of 108° C. as measured according to the above-mentioned DTA method and an Sp value of 8.1 (cal/cc)$^{\frac{1}{2}}$ PP: isotactic polypropylene having a density of 0.90 g/cc, a melting point of 154° C. as measured according to the above-mentioned DTA method and an Sp value of 7.9 (cal/cc)$^{\frac{1}{2}}$ PS: atactic polystyrene having a melt index of 6.0 g/10 mm, a glass transition point of 92° C. as measured according to the above-mentioned DTA method and an Sp value of 8.6 (cal/cc)$^{\frac{1}{2}}$ Each tube was cut open in a direction parallel to the extrusion direction and was subjected to simultaneous biaxial drawing by using a biaxial drawing machine (manufactured by Iwamoto Seisakusho Co.). The drawing was carried out at 120° C. The initial length of the sample was 80 mm in either the axial direction or the direction normal to the axial direction. The drawing speed was 300 mm/min. The elongation ($\epsilon$) was determined according to the formula (7) given hereinbefore. In this drawing test, breakage occurred preferentially in the direction rectangular to the axial direction. Test results are shown in Table 7.

TABLE 7

| Kinds of Resins | | | | Mixing Ratios (% by weight) | | | | Arithmetic Mean ($\overline{\epsilon}$) (%) of Elongations | Measured Elongation ($\epsilon$) (%) |
|---|---|---|---|---|---|---|---|---|---|
| A | B | C | D | A | B | C | D | | |
| EV | — | — | — | 100 | — | — | — | | 25 |
| N1 | — | — | — | 100 | — | — | — | | 110 |
| N2 | — | — | — | 100 | — | — | — | | 130 |
| PET | — | — | — | 100 | — | — | — | | 35 |
| AS | — | — | — | 100 | — | — | — | | 10 |
| XT | — | — | — | 100 | — | — | — | | 65 |
| Su | — | — | — | 100 | — | — | — | | molten |
| HD | — | — | — | 100 | — | — | — | | 500 |
| LD | — | — | — | 100 | — | — | — | | molten |
| PP | — | — | — | 100 | — | — | — | | 450 |
| PS | — | — | — | 100 | — | — | — | | 80 |
| EV | PET | — | — | 50 | 50 | — | — | 30 | 45 |
| EV | AS | — | — | 50 | 50 | — | — | 17.5 | 25 |
| EV | XT | — | — | 50 | 50 | — | — | 45.0 | 60 |
| EV | N1 | — | — | 50 | 50 | — | — | 67.5 | 185 |
| EV | N2 | — | — | 50 | 50 | — | — | 77.5 | 220 |
| EV | HD | — | — | 50 | 50 | — | — | 262.5 | 20 |
| N1 | PS | — | — | 50 | 50 | — | — | 95.0 | 10 |
| N2 | PET | — | — | 50 | 50 | — | — | 82.5 | 105 |
| N2 | AS | — | — | 50 | 50 | — | — | 70.0 | 90 |
| N2 | XT | — | — | 50 | 50 | — | — | 97.5 | 110 |
| N2 | PP | — | — | 50 | 50 | — | — | 290 | 15 |
| EV | N2 | XT | — | 45 | 45 | 10 | — | 76.3 | 200 |
| EV | N2 | Su | — | 45 | 45 | 10 | — | — | 215 |
| EV | LD | Su | — | 45 | 45 | 10 | — | — | 15 |
| EV | N2 | LD | Su | 42 | 42 | 8 | 8 | — | 220 |
| EV | N2 | PP | Su | 42 | 42 | 8 | 8 | — | 215 |
| EV | PS | PP | Su | 42 | 42 | 8 | 8 | — | 10 |
| EV | PS | PP | HD | 42 | 42 | 8 | 8 | 120.1 | <10 |

As will be apparent from the results shown in Table 7, in each of the resin blends in which the Sp value of each resin is at least 9.5 (cal/cc)$^{\frac{1}{2}}$ and the difference ($\Delta$Sp) of the Sp value in the resins is not greater than 4.5 (cal/cc)$^{\frac{1}{2}}$, the elongation ($\epsilon$) is higher than the arithmetic mean ($\overline{\epsilon}$) of elongations of the respective resins. This tendency is most conspicuous in a combination of an ethylene-vinyl alcohol copolymer (EV) with a polyamide resin (N1 or N2). Further, this tendency is not substantially changed even if a small amount of a resin having an Sp value lower than 9.5 (cal/cc)$^{\frac{1}{2}}$ is incorporated in a blend of EV and N2.

EXAMPLE 2

An ethylene-vinyl alcohol copolymer (EV) having the same properties as described in Example 1 and a caprolactam/hexamethylene diammonium adipate copolymer (nylon 6/6-6 copolymer, N2) having the same properties as described in Example 1 were dry-blended at various mixing weight ratios indicated in Table 8, and the resulting blends were blow-molded into tubes having a diameter of 40 mm and a thickness of 0.2 mm under the same conditions by using the same extruder as described in Example 1. In the same manner as described in Example 1, each tube was cut open in the extrusion direction (axial direction) and subjected to the simultaneous biaxial drawing test by using the same biaxial drawing machine as described in Example 1 to obtain results shown in FIG. 1.

From the results shown in FIG. 1, it is seen that the elongation ($\epsilon$) of each blend of the ethylene-vinyl alcohol copolymer (EV) and the nylon 6/6-6 copolymer (N2) is higher than the arithmetic mean ($\bar{\epsilon}$) of the elongations of the respective resins. It also is seen that the elongation is highest when the N2/EV mixing weight ratio is about 60/40.

Samples formed from respective resin blends are simultaneously biaxially drawn under the same conditions as described above by using the same biaxial drawing machine. The draw ratio was 100% in each direction. With respect to these biaxially drawn samples and corresponding undrawn samples, the oxygen permeability ($PO_2$) and the carbon dioxide gas permeability ($PCO_2$) were measured at a temperature of 37° C. and a relative humidity of 0% by using a gas permeation tester. Further, the water vapor transmission rate ($QH_2O$; calculated as 50$\mu$ thickness) was measured according to the method of JIS Z-0208 with respect to each sample.

Still further, with respect to each of the 100% biaxially drawn samples, the thermal shrinkability ($\delta$) in either the axial direction (MD) or the direction (TD) normal to the axial direction was determined according to the formula (9) given hereinbefore after standing in an oven maintained at 140° C., for 15 minutes.

Test results are shown in Table 8.

Table 8, it is apparent that in blends of EV and N2, the gas barrier property is improved by the drawing effect.

EXAMPLE 3

By using an inner layer and outer layer extruder installed with a full-flighted screw having a diameter of 65 mm and an effective length of 1430 mm and provided with a melt channel branched in two flow passages, an intermediate layer extruder provided with a full-flighted screw having a diameter of 50 mm and an effective length of 1100 mm and a three-ply die for formation of a multilayer structure, a pipe having an inner diameter of 40 mm, a length of 110 mm (the length of the screwed portion of 10 mm) and a thickness of 2.4 mm as shown in FIG. 2 was blow-molded. The same polyethylene terephthalate (PET) as used in Example 1 was used for the inner and outer layers, and (a) the same ethylenevinyl alcohol copolymer as used in Example 1, (b) the same caprolactam/hexamethylene diammonium adipate copolymer (nylon 6/6-6 copolymer) as used in Example 1 or (c) a 40/60 weight ratio blend of the above-mentioned ethylene-vinyl alcohol copolymer and the above-mentioned nylon 6/6-6 copolymer was used for the intermediate layer. The outer layer:intermediate layer:inner layer thickness ratio was 1:1:1. For comparison, the above-mentioned PET alone was blow-molded into a pipe of the same shape by using the outer and inner layer extruder alone, and the above-mentioned ethylene-vinyl alcohol alone, the above-mentioned nylon 6/6-6 copolymer alone and the above-mentioned blend (c) alone were separately blow-molded into pipes of the same shape by using the intermediate layer extruder alone.

Each of the so prepared 7 pipes was heated at 110° C. for 5 minutes and a cylindrical bottle having an inner diameter of 100 mm, a height of 150 mm from the bottom to the shoulder portion, an inner capacity of 1178 cc and a unit volume of 0.22–0.29 dl/g was prepared from the heated pipe by using a mold maintained at 20° C. according to the successive biaxial draw-molding method illustrated in FIG. 3. The drawn multi-layer bottle composed of the above-mentioned PET and (a) was designated as bottle A, the drawn multi-layer bottle

TABLE 8

| N2/EV Mixing Weight Ratio | $PO_2$ [cc . cm/cm$^2$ . sec . cmHg] | | $PCO_2$ [cc . cm/cm$^2$ . sec . cmHg] | | $QH_2O$ [g/m$^2$ . day . 50$\mu$] | | $\delta$ [%] | |
|---|---|---|---|---|---|---|---|---|
| | undrawn | 100% drawn | undrawn | 100% drawn | undrawn | 100% drawn | MD | TD |
| 0/100 | 0.033 × 10$^{-11}$ | * | 0.046 × 10$^{-11}$ | * | 145 | * | * | * |
| 20/80 | 0.061 × 10$^{-11}$ | 0.044 × 10$^{-11}$ | 0.405 × 10$^{-11}$ | 0.052 × 10$^{-11}$ | 147 | 145 | 6.8 | 5.4 |
| 50/50 | 0.116 × 10$^{-11}$ | 0.063 × 10$^{-11}$ | 0.907 × 10$^{-11}$ | 0.089 × 10$^{-11}$ | 155 | 146 | 8.9 | 7.7 |
| 60/40 | 0.145 × 10$^{-11}$ | 0.072 × 10$^{-11}$ | 1.12 × 10$^{-11}$ | 0.101 × 10$^{-11}$ | 158 | 147 | 9.6 | 8.1 |
| 70/30 | 0.174 × 10$^{-11}$ | 0.089 × 10$^{-11}$ | 1.36 × 10$^{-11}$ | 0.184 × 10$^{-11}$ | 161 | 150 | 8.2 | 7.3 |
| 80/20 | 0.233 × 10$^{-11}$ | 0.113 × 10$^{-11}$ | 1.76 × 10$^{-11}$ | 0.522 × 10$^{-11}$ | 166 | 159 | 7.5 | 6.2 |
| 100/0 | 0.331 × 10$^{-11}$ | 0.798 × 10$^{-11}$ | 2.25 × 10$^{-11}$ | 4.94 × 10$^{-11}$ | 176 | 247 | 2.6 | 2.1 |

*: measurement was impossible because the sample could not be drawn at a draw ratio of 100%

From the results shown in Table 8, it will readily be understood that in case of EV alone, the measurement is impossible because it cannot be drawn at a draw ratio of 100%, and that in case of N2 alone, each of the oxygen permeability, the carbon dioxide permeability and the water vapor transmission rate ($PO_2$, $PCO_2$ and $QH_2O$) of the 100% drawn sample was higher than in the undrawn sample; namely, the gas barrier property is degraded by drawing. In contrast, in case of blends of EV and N2, each gas permeability of each drawn sample is lower than that of the corresponding undrawn sample, and the thermal shrinkability ($\delta$) is higher than that of the sample of N2 alone. Thus, from the results shown in composed of the above-mentioned PET and (b) was designated as bottle B, the drawn multi-layer bottle composed of the above-mentioned PET and (c) was designated as bottle C, the drawn bottle composed of the above-mentioned PET alone was designated as bottle D, the drawn bottle composed of the above-mentioned ethylene-vinyl alcohol copolymer alone was designated as bottle E, the bottle composed of the above-mentioned nylon 6/6-6 copolymer alone was designated as bottle F, and the bottle composed of the above-mentioned blend (c) alone was designated as bottle G.

For comparison, seven corresponding cylindrical multi-layer, single resin and resin blend bottles were molded by using the above-mentioned extruders and a mold for forming bottles according to a known direct blow-molding method (hollow molding method using a molten parison). Since each of these 7 bottles was formed from a molten parison according to the hollow molding method, it was fonud as a result of the polarizing fluorophotometry that each was an undrawn bottle. These undrawn bottles corresponding to the above-mentioned bottles A to G were designated as bottles J, K, L, M, N, P and Q, respectively.

With respect to each of the so prepared bottles, the moldability was evaluated by the visual observation test by a panel of 5 men and the oxygen permeation rate, $Q_{O_2}$ was determined according to the method disclosed in Japanese Patent Application Laid-Open Specification No. 49379/75. Further, 1000 g of service water was filled in each of 3 bottles of one kind, and the mouth portion of each bottle was heat-sealed with an aluminum foil-laminated film. Then, the bottles were allowed to stand in an atmosphere maintained at a temperature of 50° C. and a relative humidity of 10% for 7 days, and the water decrease ratio Lw was calculated according to the following formula:

$$Lw = 100 \times [Lo - Lt]/Lo$$

wherein Lo stands for the quantity of initially charged water, i.e., 1000 g and Lt stands for an average quantity of water after standing for 7 days.

Separately, 1200 g of saline water was filled in each of 10 bottles of one kind and the bottles were allowed to stand still in an atmosphere maintained at $-1°$ C. in 3 days and nights. Then, the bottles were immediately let to fall on a concrete floor from a height of 1.2 m at a temperature of 20° C. so that the bottoms of the bottles hit on the floor face. The falling strength Fb was determined according to the following formula:

$$Fb = 100 \times [10 - Fl]/10$$

wherein Fl denotes the number of bottles which are not broken at the above falling test.

Coca Cola ® (registered trademark) (1000 g) was filled in a bottle and the bottle was then allowed to stand at 25° C. for 48 hours. The carbon dioxide gas pressure change $LCO_2$ was determined according to the following formula:

$$LCO_2 = 100 \times [Po - Pt]/Po$$

wherein Po stands for the initial carbon dioxide gas pressure (about 3 Kg/cm$^2$) and Pt stands for the carbon dioxide gas pressure after standing for 48 hours. Moreover, the deformation ratio Df was determined according to the following formula:

$$Df = 100 \times [Vt - Vo]/Vo$$

wherein Vo stands for the initial volume of the bottle and Vt stands for the volume of the bottle after standing for 48 hours from filling of Coca Cola ®.

A square specimen formed by cutting the bottle wall along 50 mm in the axial direction (MD) and along 50 mm in the direction (TD) rectangular to the axial direction was allowed to stand in an oven maintained at 130° C. for 15 minutes and the thermal shrinkability was determined in either the MD direction or the TD direction according to the formula (9) given hereinbefore.

Obtained results are shown in Table 9.

TABLE 9

| Bottle | Moldability | $QO_2$ [cc/m$^2$ . day . atm] | Lw (%) | Fb (%) | $LCO_2$ (%) | Df (%) | δ (%) MD | δ (%) TD |
|---|---|---|---|---|---|---|---|---|
| A | slightly bad | 5.7 | 0.29 | 70 | 10 | 5 | 8.1 | 9.6 |
| B | good | 8.3 | 0.27 | 50 | 9 | 4 | 8.3 | 9.7 |
| C | good | 1.3 | 0.23 | 10 | 6 | 2 | 8.4 | 9.8 |
| D | good | 5.4 | 0.22 | 10 | 11 | 4 | 8.2 | 9.5 |
| E | not drawable | * | * | * | * | * | * | * |
| F | slightly bad | 5.6 | 2.24 | 70 | 39 | 57 | 4.4 | 4.6 |
| G | good | 1.1 | 0.73 | 10 | 16 | 25 | 9.5 | 10.2 |
| J | good | 1.4 | 0.42 | 90 | 31 | 39 | <2 | 2 |
| K | good | 7.7 | 0.45 | 80 | 37 | 35 | <2 | 2.5 |
| L | good | 5.3 | 0.43 | 40 | 32 | 30 | <2 | 2.5 |
| M | good | 11.2 | 0.31 | 40 | 20 | 26 | <2 | 2 |
| N | good | 0.5 | 1.49 | 100 | 24 | >60 | <2 | 3.5 |
| P | good | 4.7 | 1.80 | 60 | 36 | >60 | <2 | 3 |
| Q | good | 2.6 | 1.61 | 10 | 33 | >60 | <2 | 3 |

*since drawing was impossible in case of the ethylene-vinyl alcohol copolymer alone, bottle E, the resin could not be formed into a bottle and properties could not be evaluated.

From the results shown in Table 9, it will readily be understood that the ethylene-vinyl alcohol copolymer (E) cannot be biaxially draw-blow molded according to the draw molding method and that undrawn bottles (J to Q) are inferior to biaxially drawn blow-molded bottles (A to G) because the loss of the carbon dioxide pressure is great and the bottle deformation is large. From the results shown in Table 9, it will also be apparent that a bottle (C) having a multi-layer structure including inner and outer layers of the polyethylene terephthalate resin and an intermediate layer of the blend of the above-mentioned copolyamide and ethylene-vinyl alcohol copolymer have gas barrier characteristics, $QO_2$, $LCO_2$ and Lw, highly improved by the drawing effect, as is seen from the δ values, and it is also excellent in mechanical properties such as the deformation resistance and falling strength. It will also be understood that the gas barrier property of the bottle of the above blend can be improved by the drawing effect.

EXAMPLE 4

By using the same inner and outer layer extruder, intermediate layer extruder and three-ply die as used in Example 3, end-opened bottomless pipes (tubes) of a three-layer structure having a total wall thickness of about 10 mm, an inner diameter of 30 mm and a height of 30 mm from the bottom to the shoulder were formed according to a known co-extrusion method. As the intermediate layer-constituting resin, there was used a 40/60 weight ratio mixture of the same ethylene-vinyl alcohol copolymer and caprolactam/hexamethylene diammonium adipate copolymer (nylon 6/6-6 copolymer) as used in Example 3. As the outer and inner layer-constituting resin, there was employed (a) an ethylene-propylene copolymer having an ethylene content of about 10 mole % and a melting point of 157° C., (b) a product obtained by chemically modifying the above ethylene-propylene copolymer (a) with 1 mole % of maleic anhydride (the melting point was 156° C.), (c) a product obtained by chemically modifying the above ethylene-propylene copolymer (a) with 3 mole % of maleic anhydride (the melting point was 155° C.) or (d) a product obtained by chemically modifying the above ethylene-propylene copolymer (a) with 5 mole % of maleic anhydride (the melting point was 154° C.). The outer layer:intermediate layer:inner layer thickness ratio was 1:1:1 in each pipe. The carbonyl group concentrations and viscoelastic properties of the ethylene-propylene copolymers (a) to (d) are shown in Table 10.

TABLE 10

| Inner and Outer Layer-Constituting Resin | Carbonyl Group Concentration [meg/100 g] | $(E_g + E_l) \times 10^{-10}$ [dyne/cm$^2$]* | $\eta_\infty \times 10^{-17}$ [poise]* | $t_R \times 10^{-5}$ [sec]* |
|---|---|---|---|---|
| (a) | 0 | 2.29 | 5.74 | 8.38 |
| (b) | 48 | 2.27 | 5.61 | 8.32 |
| (c) | 139 | 2.24 | 5.46 | 8.25 |
| (d) | 220 | 2.20 | 5.26 | 8.11 |

*as measured at a temperature of 23° C. under a stress of $7 \times 10^7$ dyne/cm$^2$ Each of the so prepared 4 bottomless pipes (tubes) was heated at 148°±1° C. for 20 minutes, and both the ends of the pipe were clipped by clamps and the pipe was first drawn in the longitudinal direction. Then, the pipe was supported by a mold for blow molding and air was introduced under pressure from one end to inflate the pipe in the lateral direction, whereby the blow molding of the pipe was effected and a biaxially draw-blow molded bottle having a symmetric three-layer structure was obtained. The so formed bottle had a cylindrical shape having an inner diameter of 100 mm, a height of 150 mm from the bottom to the shoulder, an average wall thickness of 0.6 mm, an inner capacity of about 1180 cc and a unit volume of about 0.31 dl/g. The bottle having a multi-layer structure including an intermediate layer of the 40/60 weight ratio mixture of the above-mentioned ethylene-vinyl alcohol copolymer and nylon 6/6-6 copolymer and outer and inner layers of the ethylene-propylene copolymer (a) was designated as bottle OPR, the bottle having a multi-layer structure including an intermediate layer of the above copolymer mixture and inner and outer layers of the above-mentioned modified ethylene-propylene copolymer (b) was designated as bottle OPS, the bottle having a multi-layer structure including an intermediate layer of the above copolymer mixture and inner and outer layers of the above-mentioned modified ethylene-propylene copolymer (c) was designated as bottle OPT, and the bottle having a multi-layer structure including an intermediate layer of the above copolymer mixture and inner and outer layers of the above-mentioned modified ethylene-propylene copolymers (d) was designated as bottle OPU.

For comparison, bottles having the same shape, size and resin layer structure as described above were prepared by using the same extruders and mold for blow molding as described above according to a known direct blow molding method (hollow molding of a molten parison). Since each of the so prepared 4 multi-layer bottles was formed from a molten parison according to the hollow blow molding, it was found as a result of X-ray diffractiometry and polarizing fluorophotometry that each layer of the bottle was undrawn. These undrawn bottles corresponding to the above bottles OPR, OPS, OPT and OPU were designated as bottles DBR, DBS, DBT and DBU, respectively.

With respect to each of the foregoing 8 bottles, the oxygen permeation rate QO$_2$ and falling strength Fb were tested in the same manner as described in Example 3. From the body portion of each bottle, three specimens having a width of 10 mm (cut in the lateral direction of the bottle) and a length of 100 mm (cut in the longitudinal direction) were cut, and the T peel strength Tp was measured in an atmosphere maintained at room temperature (20° C.) and a relative humdiity of 60% at a peeling speed of 100 mm/min. Obtained results are shown in Table 11.

TABLE 11

| | | | Tp [g/cm] | |
|---|---|---|---|---|
| Bottle | QO$_2$ [cc/m$^2$ · day · atm] | Fb (%) | Interlaminal Peel Strength between Outer and intermediate Layers | Interlaminar Peel Strength between Intermediate and Inner Layers |
| OPR | 1.5 | 60 | 5 | 4 |
| OPS | 1.3 | 20 | 40 | 32 |
| OPT | 1.1 | 10 | 150 | 135 |
| OPU | 1.1 | 0 | 450 | 420 |
| DBR | 5.5 | 100 | 7 | 4 |
| DBS | 5.3 | 80 | 45 | 35 |
| DBT | 5.3 | 70 | 150 | 140 |
| DBU | 5.2 | 70 | 440 | 430 |

From the results shown in Table 11, it will readily be understood that QO$_2$ and Fb are improved by biaxial draw-blow molding even if the inner and outer layer are composed of a polypropylene type resin, and that if the polypropylene type resin containing inner and outer layers is chemically modified with a carbonyl group-containing organic compound, such as maleic anhydride, the interlaminar peel strength Tp between the two adjacent layers is improved and this improved interlaminar peel strength is not substantially degraded by drawing.

Coca Cola ® (registered tradename) (1000 g) was filled in each of the foregoing 8 three-layer bottles, and the filled bottle was allowed to stand at 25° C. for 48 hours. Then, the carbon dioxide gas pressure change LCO$_2$, the bottle deformation Df and the thermal shrinkability δ in either the MD or TD direction on the bottle wall were measured according to the methods described in Example 3 to obtain results shown in Table 12.

TABLE 12

| | LCO$_2$ | Df | δ (%) | |
|---|---|---|---|---|
| Bottle | (%) | (%) | MD | TD |
| OPR | 9 | 14.3 | 7.1 | 7.3 |
| OPS | 8 | 14.6 | 7.0 | 7.3 |
| OPT | 8 | 15.0 | 7.0 | 7.1 |
| OPU | 7 | 15.2 | 7.2 | 7.3 |
| DBR | 44 | >60 | <2 | <2 |
| DBS | 41 | >60 | <2 | <2 |
| DBT | 40 | >60 | <2 | <2 |

TABLE 12-continued

| Bottle | LCO$_2$ (%) | Df (%) | δ (%) MD | δ (%) TD |
|---|---|---|---|---|
| DBU | 40 | >60 | <2 | <2 |

EXAMPLE 5

A bottomless pipe having a symmetric five-layer structure was prepared according to a known co-extrusion method by using as an intermediate-layer constituting resin a 48:52 mixing weight ratio mixture of the same ethylene-vinyl alcohol copolymer (EV) and caprolactam/hexamethylene diammonium adipate copolymer (N2) as described in Example 1, as an adhesive layer-constituting resin (a) polypropylene chemically modified with styrene and maleic anhydride (melting point=165° C.; carbonyl group concentration=125 meq/100 g; hereinafter referred to as "MPP"), (b) a resin composition formed by adding 0.2 part by weight of cobalt acetate to 100 parts by weight of an ethylene-vinyl acetate copolymer chemically modified with acrylic acid and maleic anhydride (melting point=110° C.; carbonyl group concentration=198 meq/100 g; hereinafter referred to as MEVA) or (c) a 50:50 mixing weight ratio mixture, hereinafter referred to as MPEM, of the above-mentioned MPP and MEVA, and as an inner layer- and outer layer-constituting resin isotactic polypropylene (iso-PP; melting point=167° C.) shown in Table 5 given hereinbefore.

An inner and outer layer extruder used was installed with a full-flighted screw having a diameter of 65 mm and an effective length of 1430 mm and provided with a melt channel branched into 2 flow passages. An adhesive layer extruder used was installed with a full-flighted screw having a diameter of 50 mm and an effective length of 1100 mm and provided with a melt channel branched into 2 flow passages. An intermediate layer extruder used was provided with a nylon type screw having a diameter of 40 mm and an effective length of 880 mm. A 5-ply co-extension die used was maintained at a temperature of 210° C. The so prepared pipes had the same dimensions as those of pipes obtained in Example 4. The inner and outer layer:adhesive layer:intermediate layer thickness ratio was 1:0.05:0.1.

The so obtained 3 kinds of pipes were heated at 159°±1° C. for 30 minutes and they were formed into biaxially draw-blow molded cylindrical bottles of a symmetric 5-layer structure having the same shape and dimensions as those of the bottles formed in Example 4, under the same conditions according to the same procedures as described in Example 4. The bottle comprising an adhesive layer of the above polymer (a) was designated as bottle OPV, the bottle comprising an adhesive layer of the above polymer (b) was designated as bottle OPW and the bottle comprising an adhesive layer of the above polymer blend (c) was designated as bottle OPX.

For comparison, bottles of a symmetric 5-layer structure having the same shape and dimensions as described above and comprising an intermediate layer composed of the above-mentioned ethylene-vinyl alcohol copolymer (EV) alone or caprolactam/hexamethylene diammonium adipate copolymer (N2) alone, an adhesive layer composed of the above-mentioned chemically modified polyolefin (a), (b) or (c) and inner and outer layers composed of the above mentioned isotactic polypropylene were prepared under the same bottomless pipe-extruding and bottle biaxial-drawing conditions as described above.

The bottle comprising an adhesive layer of MPP and an intermediate layer of EV alone was designated as bottle REV-a, the bottle comprising an adhesive layer of MEVA and an intermediate layer of EV alone was designated as REV-b, the bottle comprising an adhesive layer of MPEA and an intermediate layer of EV alone was designated as bottle REV-c, the bottle comprising an adhesive layer of MPP and an intermediate layer of N2 alone was designated as bottle RN2-a, the bottle comprising an adhesive layer of MEVA and an intermediate layer of N2 alone was designated as bottle RN2-b, and the bottle comprising an adhesive layer of MPEA and an intermediate layer of N2 alone was designated as bottle RN2-c.

With respect to each of the so prepared 9 biaxially draw-blow molded bottles having a symmetric 5-layer structure, the moldability, oxygen permeation rate QO$_2$, water decrease ratio Lw, falling strength Fb and interlaminar peel strength Tp between the adhesive and intermediate layers were determined according to the methods described in Examples 3 and 4 to obtain results shown in Table 13.

TABLE 13

| Bottle | Moldability | QO$_2$ [cc/m$^2$ . day . atm] | Lw (%) | Fb (%) | Tp [g/cm]* |
|---|---|---|---|---|---|
| OPV | good | 13.7 | 0.06 | 10 | 395 |
| OPW | slightly bad | 15.8 | 0.07 | 20 | 260 |
| OPX | good | 9.9 | 0.05 | 0 | 685 |
| REV-a | slightly bad | 65.1 | 0.06 | 100 | 15 |
| REV-b | bad | 55.7 | 0.07 | 90 | 350 |
| REV-c | slightly bad | 57.8 | 0.06 | 80 | 245 |
| RN2-a | good | 84.0 | 0.05 | 0 | 580 |
| RN2-b | slightly bad | 89.3 | 0.06 | 40 | 110 |
| RN2-c | good | 84.2 | 0.05 | 20 | 320 |

*Tp, an average value of the interlaminar peel strength between the outer adhesive layer and the intermediate layer and the interlaminar peel strength between the inner adhesive layer and the intermediate layer From the results shown in Table 13, it will readily be understood that the biaxially draw-blow molded bottle OPX having a symmetric 5-layer structure including an intermediate layer of the blend of EV and N2, an adhesive layer of the blend (MPEA) of MPP and MEVA and inner and outer layers of the isotactic polypropylene is most excellent collectively in the moldability, oxygen permeability, falling strength and interlaminar peel strength.

EXAMPLE 6

A biaxially draw-blow molded bottle of a symmetric 5-layer structure was formed under the same pipe-molding and biaxial draw-blow molding conditions as described in Example 5 by using as the intermediate layer-constituting polymer a three-component polymer blend formed by incorporating 10 parts by weight of Surlyn® A [ionomer manufactured by Du Pont; ion type=Na+; melting point=104° C.; Sp value=7.9 (cal/cc)$^{\frac{1}{2}}$] into 100 parts by weight of a 48:52 mixing weight ratio mixture of the same ethylene-vinyl alcohol copolymer (EV) and caprolactam/hexamethylene diammonium adipate copolymer (N2) as used in Example 5, as the adhesive layer-constituting resin the same 50:50 weight ratio mixture (MPEA) of MPP and MEVA as used in Example 5 and as the inner and outer layer-constituting resin the same isotactic polypropylene as used in Example 5. The shape, dimension and layer thickness ratio of the so prepared bottle were the same as those of the bottles prepared in Example 5. This bottle was designated as bottle OPY.

Properties of the bottle OPY were determined according to the same methods as adopted in Example 5. The moldability was good, the oxygen permeation rate was 10.3 cc/cm$^2$.day.atm, the water decrease ratio was 0.05 %, the falling strength was 0%, and the average peel strength was 710 g/cm. If these results are compared with the results obtained with respect to the bottle OPX in Example 5 (see Table 13), it will readily be understood that even if about 10 parts by weight of a polymer having an SP value lower than 9.5 (cal/cc)$^{\frac{1}{2}}$, such as the above-mentioned Surlyn ® A is incorporated into 100 parts by weight of the resin blend constituting an intermediate layer, properties of the resulting drawn bottle are not substantially degraded.

With respect to each of the bottle OPX obtained in Example 5 and the bottle OPY obtained in this Example, the carbon dioxide gas pressure change LCO$_2$, the deformation ratio Df and the thermal shrinkability δ in either the MD or TD direction were determined according to the methods described in Example 3 to obtain results shown in Table 14.

TABLE 14

| Example No. | Bottle | LCO$_2$ (%) | Df (%) | δ (%) MD | δ (%) TD |
|---|---|---|---|---|---|
| 5 | OPX | 63 | 10.7 | 5.2 | 5.7 |
| 6 | OPY | 70 | 10.8 | 5.3 | 5.5 |

EXAMPLE 7

A biaxially draw-blow molded bottles of a symmetric 5-layer structure was prepared by using the same co-extruder and 5-ply extrusion die (maintained at 245° C.) as used in Example 5 under the same bottomless pipe-molding and draw-blow molding conditions as in Example 4 (except that the die temperature was changed to 245° C. at the pipe-molding step). The shape and dimensions of the bottle were the same as those of the bottles obtained in Example 5, but the outer and inner layer: adhesive layer: intermediate layer thickness ratio was changed to 1:0.05:0.025. The resins used for respective layers were as shown below. This biaxially draw-blow molded bottle having a 5-layer structure was designated as bottle OPZ.

Intermediate Layer:

A mixture of the same polycaprolactam (N1) as used in Example 1, an ethylene-vinyl alcohol copolymer having an ethylene content of 49.5 mole %, a vinyl acetate content of 3.2 mole % and a vinyl alcohol content of 47.3 mole % and being characterized by an Sp value of 10.1 (cal/cc)$^{\frac{1}{2}}$, a melting point of 155° C. as measured according to the method described in Example 1 and an oxygen permeability (PO$_2$) of 0.21×10$^{-11}$ cc·cm/cm$^2$·sec·cmHg (37° C., 0% RH) (hereinafter referred to as EV2) and poly-p-xylene-adipamide (aromatic polyamide; hereinafter referred to as N3) characterized by an Sp value of 11.9 (cal/cc)$^{\frac{1}{2}}$, a melting point of 240° C. as measured according to the method described in Example 1 and an oxygen permeability of 0.041×10$^{-11}$ cc·cm/cm$^2$·sec·cmHg (37° C., 0% RH), in which the mixing ratio of (N1/EV2):N3 was (35/65):40.

Adhesive Layer:
MPEA used in Example 4.
Inner and Outer Layers:
The same ethylene-propylene copolymer (a) of an ethylene content of 10 mole % as used in Example 4.

For comparison, a bottle of a symmetric 5-layer structure having the same shape, dimensions, layer-constituting resins and layer thickness ratio as those of the above-mentioned bottle OPZ was prepared according to a known direct blow molding method (hollow molding of a molten parison) by using the same extruder and blowing mold as mentioned above. This direct blow-molded bottle was designated as bottle DBZ.

According to the methods described in Example 3, with respect to each of the foregoing bottles OPZ and DBZ, the oxygen permeation rate QO$_2$, water decrease ratio Lw, falling strength Fb, carbon dioxide gas pressure change LCO$_2$, deformation ratio Df and thermal shrinkability δ in either the MD or TD direction of the bottle wall were determined to obtain results shown in Table 15.

TABLE 15

| Bottle | QO$_2$ [cc/m$^2$. day . atm] | Lw (%) | Fb (%) | LCO$_2$ (%) | Df (%) | δ (%) MD | δ (%) TD |
|---|---|---|---|---|---|---|---|
| OPZ | 26.4 | 0.09 | 0 | 85 | 13.9 | 7.0 | 7.2 |
| DBZ | 103 | 0.20 | 30 | 172 | >60 | <2 | <2 |

From the results shown in Table 15, it will readily be understood that also in case of a bottle of a symmetric 5-layer structure composed of the above-mentioned resins, the resistance to permeation of oxygen, carbon dioxide gas and water vapor can be highly improved by biaxial draw-blow molding conducted at a temperature lower than the melting point of a resin having a lowest melting point among the bottle-constituting resins, and also mechanical properties such as the deformation resistance and falling strength can be highly improved.

EXAMPLE 8

Two or more resins indicated below were dry-blended at mixing weight ratios indicated in Table 16. These resin blends were extruded into sheets having a width of 150 mm and a thickness of 0.5 by using an extruder having a diameter of 50 mm and an effective length of 1100 mm. For comparison, respective resins were independently extruded into similar sheets (having a thickness of 0.5 mm). Resins used are as follows:

EV: an ethylene-vinyl alcohol copolymer having an ethylene content of 25 mole %, a vinyl acetate content of 0.5 mole % and a vinyl alcohol content of 74.5 mole % and being characterized by an Sp value of 11.3 (cal/cc)$^{\frac{1}{2}}$, an intrinsic viscosity of 0.12 l/g and melting point of 182° C. as measured according to the differential thermal analysis method (DTA method) at a temperature-elevating rate of 10° C./min N1: polycaprolactam characterized by an Sp value of 12.7 (cal/cc)$^{\frac{1}{2}}$, a relative viscosity of 1.9 and a melting point of 219° C. as measured according to the above-mentioned DTA method N2: a caprolactam/hexamethylene diammonium adipate copolymer (Nylon 6/6-6 copolymer) characterized by an Sp value of 12.8 (cal/cc)$^{\frac{1}{2}}$, a relative viscosity of 3.3, a caprolactam concentration of 91 mole % and a melting point of 193° C. as measured according to the above-mentioned DTA method PET: polyethylene terephthalate characterized by an Sp value of 10.7 (cal/cc)$^{\frac{1}{2}}$, an intrinsic viscosity of 0.09 l/g as measured at 30° C. in a 50/50 weight ratio mixed solvent of phenol and tetrachloroethane and a melting point of 256° C. as measured according to the above-mentioned DTA method AS: Cycopac® 930 (product of Borg-Warner Co.) aving an Sp value of 11.7 (cal/cc)½ and a glass transition point of 107° C. as measured according to the above-mentioned DTA method XT:XT® polymer (product of American Cyanamid Co.) having an Sp value of 9.8 (cal/cc)½ and a glass transition point of 102° C. as measured according to the above-mentioned DTA method Su: Surlyn® A (product of Du Pont) (ionomer) having an Sp value of 7.9 (cal/cc)½ and a melting point of 104° C. as measured according to the above-mentioned DTA method HD: high density polyethylene having a density of 0.94 g/cc, a melting point of 140° C. as measured according to the above-mentioned DTA method and an Sp value of 7.9 (cal/cc)½

LD: low density polyethylene having a density of 0.92 g/cc, a melting point of 108° C. as measured according to the above-mentioned DTA method and an Sp value of 8.1 (cal/cc)½

PP: isotactic polypropylene having a density of 0.90 g/cc, a melting point of 154° C. as measured according to the above-mentioned DTA method and an Sp value of 7.9 (cal/cc)½

PS: atactic polystyrene having a melting index of 6.5 g/10 mm, a glass transition point of 92° C. as measured according to the above-mentioned DTA method and an Sp value of 8.6 (cal/cc)½

Each sheet was subjected to simultaneous biaxial drawing by using a biaxial drawing machine (manufactured by Iwamoto Seisakusho Co.). The drawing was carried out at 120° C. The initial length of the sample was 80 mm in either the extrusion direction or the direction normal to the extrusion direction. The drawing speed was 300 mm/min. The elongation ($\epsilon$) was determined according to the formula (7) given hereinbefore. In this drawing test, breakage occurred preferentially in the direction normal to the extrusion direction. Test results are shown in Table 16.

As will be apparent from the results shown in Table 16, in each of the resin blends in which the Sp value of each resin is at least 9.5 (cal/cc)½ and the difference ($\Delta Sp$) of the Sp value in the resins is not greater than 4.5 (cal/cc)½, the elongation ($\epsilon$) is higher than the arithmetic mean ($\bar{\epsilon}$) of elongations of the respective resins. This tendency is most conspicuous in a combination of an ethylene-vinyl alcohol copolymer (EV) with a polyamide resin (N1 or N2). Further, this tendency is not substantially changed even if a small amount of a resin having an Sp value lower than 9.5 (cal/cc)½ is incorporated in a blend of EV and N2.

EXAMPLE 9

An ethylenevinyl alcohol copolymer (EV) having the same properties as described in Example 8 and a caprolactam/hexamethylene diammonium adipate copolymer (nylon 6/6-6 copolymer, N2) having the same properties as described in Example 8 were dry-blended at various mixing weight ratios, and the resulting blends were extruded into sheets having a width of 100 mm and a thickness of 0.5 mm under the same conditions by using the same extruder as described in Example 8. In the same manner as described in Example 8, each sheet was subjected to the simultaneous biaxial drawing test by using the same biaxial drawing machine as described in Example 8.

The obtained results are similar to those obtained in Example 2 (shown in FIG. 1). Namely, the elongation ($\epsilon$) of the blend of EV and N2 is higher than the arithmetic mean ($\bar{\epsilon}$) calculated from the elongations of EV and N2, and the elongation of the blend is highest when the EV/N2 mixing weight ratio is about 40/60.

Results obtained by determining $PO_2$, $PCO_2$, $QH_2O$ (as calculated as 50μ thickness) and thermal shrinkability δ in either the extrusion direction, MD or the direction normal to the extrusion direction, TD with respect to the foregoing drawn sheets and undrawn sheets are

TABLE 16

| Resins | | | | Mixing Ratios (% by weight) | | | | Arithmetic Mean ($\bar{\epsilon}$) (%) of Elongations of Respective Resins | Measured Elongation ($\epsilon$) (%) |
|---|---|---|---|---|---|---|---|---|---|
| A | B | C | D | A | B | C | D | | |
| EV | — | — | — | 100 | — | — | — | | 25 |
| N1 | — | — | — | 100 | — | — | — | | 110 |
| N2 | — | — | — | 100 | — | — | — | | 130 |
| PET | — | — | — | 100 | — | — | — | | 30 |
| AS | — | — | — | 100 | — | — | — | | 10 |
| XT | — | — | — | 100 | — | — | — | | 65 |
| Su | — | — | — | 100 | — | — | — | | molten |
| HD | — | — | — | 100 | — | — | — | | 520 |
| LD | — | — | — | 100 | — | — | — | | molten |
| PP | — | — | — | 100 | — | — | — | | 450 |
| PS | — | — | — | 100 | — | — | — | | 60 |
| EV | PET | — | — | 50 | 50 | — | — | 27.5 | 45 |
| EV | AS | — | — | 50 | 50 | — | — | 17.5 | 25 |
| EV | XT | — | — | 50 | 50 | — | — | 45.0 | 60 |
| EV | N1 | — | — | 50 | 50 | — | — | 67.5 | 185 |
| EV | N2 | — | — | 50 | 50 | — | — | 77.5 | 220 |
| EV | HD | — | — | 50 | 50 | — | — | 272.5 | 15 |
| N1 | PS | — | — | 50 | 50 | — | — | 85.0 | 10 |
| N2 | PET | — | — | 50 | 50 | — | — | 80.0 | 110 |
| N2 | AS | — | — | 50 | 50 | — | — | 70.0 | 90 |
| N2 | XT | — | — | 50 | 50 | — | — | 97.5 | 110 |
| N2 | PP | — | — | 50 | 50 | — | — | 290 | 15 |
| EV | N2 | Xt | — | 45 | 45 | 10 | — | 76.3 | 200 |
| EV | N2 | Su | — | 45 | 45 | 10 | — | — | 215 |
| EV | LD | Su | — | 45 | 45 | 10 | — | — | 15 |
| EV | N2 | LD | Su | 42 | 42 | 8 | 8 | — | 220 |
| EV | N2 | PP | Su | 42 | 42 | 8 | 8 | — | 215 |
| EV | PS | PP | Su | 42 | 42 | 8 | 8 | — | 15 |
| EV | PS | P | HD | 42 | 42 | 8 | 8 | 113.3 | <10 | quite similar to results obtained in Example 2 (shown in Table 8).

EXAMPLE 10

By using an inner layer and outer layer extruder installed with a full-flighted screw having a diameter of 65 mm and an effective length of 1430 mm and provided with a melt channel branched in two flow passages, an intermediate layer extruder provided with a full-flighted screw having a diameter of 50 mm and an effective length of 1100 mm and a three-ply T die for formation of a multi-layer structure, a sheet having a width of 200 mm and a thickness of 1.0 mm was extrusion. The same polyethylene terephthalate (PET) as used in Example 8 was used for the inner and outer layers, and (a) the same ethylene-vinyl alcohol copolymer as used in Example 8, (b) the same caprolactam/hexamethylene diammonium adipate copolymer (nylon 6/6-6 copolymer) as used in Example 8 or (c) a 40/60 weight ratio blend of the above-mentioned ethylene-vinyl alcohol copolymer and the above-mentioned nylon 6/6-6 copolymer was used for the intermediate layer. The outer layer: intermediate layer: inner layer thickness ratio was 1:1:1. For comparison, the above-mentioned PET alone was extrusion-formed into a sheet of the same shape by using the outer and inner layer extruder alone, and the above-mentioned ethylene-vinyl alcohol alone, the above-mentioned nylon 6/6-6 copolymer alone and the above-mentioned blend (c) alone were separately extrusion-formed into sheets of the same shape by using the intermediate layer extruder alone.

Each of the so prepared 7 sheets was heated at 110° C. for 5 minutes and a cylindrical cup having an inner diameter of 100 mm, a height of 150 mm, an inner capacity of 1150 cc and a unit volume of 0.22–0.29 dl/g was prepared from the heated sheet by using a mold maintained at 20° C. according to the biaxial drawing vacuum molding method illustrated in FIGS. 4, 5, 6 and 7. The drawn multi-layer cup composed of the above-mentioned PET and (a) was designated as cup SA, the drawn multi-layer cup composed of the above-mentioned PET and (b) was designated as cup SB, the drawn multilayer cup composed of the above-mentioned PET and (c) was designated as cup SC, the drawn cup composed of the above-mentioned PET alone was designated as cup SD, the drawn cup composed of the above-mentioned ethylene-vinyl alcohol copolymer alone was designated as cup SE, the cup composed of the above-mentioned nylon 6/6-6 copolymer alone was designated as cup SE, and the cup composed of the above-mentioned blend (c) alone was designatedaas cup SG.

For comparison, seven corresponding cylindrical multi-layer, single resin and resin blend cups were molded by using the above-mentioned extruders and a mold for forming cups according to a known thermoforming method (method for vacuum-molding molten sheets). Since each of these 7 cups was formed from a molten sheet according to the vacuum molding method, it was found as a result of the polarizing fluorophotometry that each was an undrawn cup. These undrawn cups corresponding to the above-mentioned cups SA to SG were designated as bottles SJ, SK, SL, SM, SN, SP and SQ, respectively.

With respect to each of the so prepared cups, the moldability was evaluated by the visual observation test by a panel of 5 men and the oxygen permeation rate, $QO_2$ was determined according to the method disclosed in Japanese Patent Application Laid-Open Specification No. 49379/75. Further, 1000 g of service water was filled in each of 3 cups of one kind, and the mouth portion of each cup was heat-sealed with an aluminum foil-laminated film. Then, the cups were allowed to stand in an atmosphere maintained at a temperature of 50° C. and a relative humidity of 10% for 7 days, and the water decrease ratio Lw was calculated according to the following formula:

$$Lw = 100 \times [Lo - Lt]/Lo$$

wherein Lo stands for the quantity of initially charged water, i.e., 1000 g and Lt stands for an average quantity of water after standing for 7 days.

Separately, 1200 g of saline water was filled in each of 10 cups of one kind and the cups were allowed to stand still in an atmosphere maintained at $-1°$ C. in 3 days and nights. Then, the cups were immediately let to fall on a concrete floor from a height of 1.2 m at a temperature of 20° C. so that the bottoms of the cups hit on the floor face. The falling strength Fb was determined according to the following formula:

$$Fb = 100 \times [10 - F1]/10$$

wherein F1 denotes the number of cups which are not broken at the above falling test. Coca Cola ® (registered trademark) (1000 g) was filled in a cup and the cup was then allowed to stand at 25° C. for 48 hours. The carbon dioxide gas pressure change $LCO_2$ was determined according to the following formula:

$$LCO_2 = 100 \times [Po - Pt]/Po$$

wherein Po stands for the initial carbon dioxide gas pressure (about 3 Kg/cm$^2$) and Pt stands for the carbon dioxide gas pressure after standing for 48 hours. Moreover, the deformation ratio Df was determined according to the following formula:

$$Df = 100 \times [Vt - Vo]/Vo$$

wherein Vo stands for the initial volume of the cup and Vt stands for the volume of the cup after standing for 48 hours from filling of Coca Cola ®.

A square specimen formed by cutting the cup wall along 50 mm in the axial direction (MD) and along 50 mm in the direction (TD) rectangular to the axial direction was allowed to stand in an oven maintained at 130° C. for 15 minutes and the thermal shrinkability was determined in either the MD direction or the TD direction according to the formula (9) given hereinbefore.

Obtained results are shown in Table 17.

TABLE 17

| Cup | Moldability | $QO_2$ [cc/m$^2$ . day . atm] | LW (%) | Fb (%) | $LCO_2$ (%) | Df (%) | δ (%) MD | TD |
|---|---|---|---|---|---|---|---|---|
| SA | slightly bad | 5.7 | 0.29 | 70 | 10 | | 8.1 | 9.6 |
| SB | good | 8.3 | 0.27 | 50 | 9 | 4 | 8.3 | 9.7 |
| SC | good | 1.3 | 0.23 | 10 | 6 | 2 | 8.4 | 9.8 |
| SD | good | 5.4 | 0.22 | 10 | 11 | 4 | 8.2 | 9.5 |
| SE | drawing impossible | * | * | * | * | * | * | * |

TABLE 17-continued

| p | Moldability | QO$_2$ [cc/m$^2$ · day · atm] | LW (%) | Fb (%) | LCO$_2$ (%) | Df (%) | δ (%) MD | δ (%) TD |
|---|---|---|---|---|---|---|---|---|
| SF | slightly bad | 5.6 | 2.24 | 70 | 39 | 57 | 4.4 | 4.6 |
| SG | good | 1.1 | 0.73 | 10 | 16 | 25 | <2 | 10.2 |
| SJ | good | 1.4 | 0.42 | 90 | 31 | 39 | <2 | 2 |
| SK | good | 7.7 | 0.45 | 80 | 37 | 35 | <2 | 2.5 |
| SL | good | 5.3 | 0.43 | 40 | 32 | 30 | <2 | 2.5 |
| SM | good | 11.2 | 0.31 | 40 | 20 | 26 | <2 | 2 |
| SN | good | 0.5 | 1.49 | 100 | 24 | >60 | <2 | 3.5 |
| SP | good | 4.7 | 1.80 | 60 | 36 | >60 | <2 | 3 |
| SQ | good | 2.6 | 1.61 | 10 | 33 | >60 | <2 | 3 |

*: since the ethylene-vinyl alcohol copolymer could not be drawn, it could not be formed into a cup and properties could not be determined From the results shown in Table 17, it will readily be understood that the ethylene-vinyl alcohol copolymer (SE) cannot be biaxially draw-molded according to the drawing vacuum molding method and that undrawn cups (SJ to SQ) are inferior to biaxially draw-molded cups (SA to SG) because the loss of the carbon dioxide pressure is great and the cup deformation is large. From the results shown in Table 17, it will also be apparent that a cup (SC) having a multi-layer structure including inner and outer layers of the polyethylene terephthalate resin and an intermediate layer of the blend of the above-mentioned copolyamide and ethylene-vinyl alcohol copolymer have gas barrier characteristics, QO$_2$, LCO$_2$ and Lw, highly improved by the drawing effect, as is seen from the δ values, and it is also excellent in mechanical properties such as the deformation resistance and falling strength. It will also be understood that the gas barrier property of the cup of the above blend can be improved by the drawing effect.

EXAMPLE 11

By using the same inner and outer layer extruder, intermediate layer extruder and three-ply T die as used in Example 10, sheets of a three-layer structure having a total wall thickness of about 1.0 mm and a width of 200 mm were forced according to a known extrusion method. As the intermediate layer-constituting resin, there was used a 40/60 weight ratio mixture of the same ethylene-vinyl alcohol copolymer and caprolactam/hexamethylene diammonium adipate copolymer (nylon 6/6-6 copolymer) as used in Example 8. As the outer and inner layer-constituting resin, there was employed (a) an ethylene-propylene copolymer having an ethylene content of about 10% by weight, (b) a product obtained by chemically modifying the above ethylene-propylene copolymer (a) with maleic anhydride, (c) a product obtained by chemically modifying the above ethylene-propylene copolymer (a) with maleic anhyydride at a higher degree of modification than in (b) (a higher maleic anhydride content) or (d) a product obtained by a chemically modifying the above ethylene-propylene copolymer (a) with maleic anhydride at a higher degree of modification than in (c) (a higher maleic anhydride content). The outer layer: intermediate layer: inner layer thickness ratio was 1:1:1 in each sheet.

Each of the so prepared 4 sheets was heated at 150° C. for 20 minutes and formed into cups by using a mold heated at 20° C. according to the biaxial drawing vacuum molding method shown in FIGS. 4, 5, 6 and 7. The so formed cup had a cylindrical shape having an inner diameter of 100 mm, a height of 150 mm, an average wall thickness of 0.6 mm and an inner capacity of about 1150 cc.

The cup having a multi-layer structure including an intermediate layer of the 40/60 weight ratio mixture of the above-mentioned ethylene-vinyl alcohol copolymer and nylon 6/6-6 copolymer and outer and inner layers of the ethylene-propylene copolymer (a) was designated as cup OA, the cup having a multi-layer structure including an intermediate layer of the above copolymer mixture and inner and outer layers of the above-mentioned modified ethylene-propylene copolymer (b) was designated as cup OB, the cup having a multi-layer structure including an intermediate layer of the above copolymer mixture and inner and outer layers of the above-mentioned modified ethylene-propylene copolymer (c) was designated as cup OC, and the cup having a multi-layer structure including an intermediate layer of the above copolymer mixture and inner and outer layers of the above-mentioned modified ethylene-propylene copolymer (d) was designated as cup OD.

For comparison, cups having the same shape, size and resin layer structure as described above were prepared by using the same extruders and mold for molding cups as described above according to a known thermoforming method (vacuum molding of a molten sheet). Since each of the so prepared 4 multi-layer cups was formed from a molten sheet according to the vacuum molding, it was found as a result of X-ray diffractiometry and polarizing fluorophotometry that each layer of the cup was undrawn. These undrawn cups corresponding to the above cups OA, OB, OC and OD were designated as cups DA, DB, DC and DD, respectively.

With respect to each of the so prepared 8 cups, the interlaminar T peel strength and falling strength Fb were determined according to the methods described in Examples 4 and 10 to obtain results shown in Table 18.

TABLE 18

| Cup | Interlaminar Strength (g/cm) between outer layer and intermediate layer | Interlaminar Strength (g/cm) between inner layer and intermediate layer | Fb (%) |
|---|---|---|---|
| OA | 7 | 5 | 100 |
| OB | 18 | 16 | 90 |
| OC | 23 | 21 | 10 |
| OD | 123 | 120 | 0 |
| DA | 10 | 9 | 100 |
| DB | 50 | 46 | 90 |
| DC | 75 | 71 | 10 |
| DD | 190 | 187 | 0 |

From the results shown in Table 18, it will readily be understood that in case of draw-molded cups, if the peel strength is higher than 20 g/cm, the Fb value is remarkably reduced, and that in case of cups formed according to the customary thermoforming method, if the peel strength is higher than 70 g/cm, the Fb value is remarkably reduced. In short, in case of draw-molded cups, an adhesion strength capable of resisting to practical application tests, such as the falling strength test, is much lower than in case of cups formed according to the customary thermoforming method.

EXAMPLE 12

Two or more of the same ethylene-vinyl alcohol copolymer (EV), polycaprolactam (N1), caprolactam/hexamethylene diammonium adipate copolymer (N2), atactic polystyrene (PS), isotactic polypropylene (PP), XT polymer (XT) and Surlyn ® A (SU) as described in Example 8 were dry-blended at mixing weight ratios shown in Table 19, and the dry blends were extruded into sheets having a thickness of about 0.5 mm by using the same extruder as used in Example 8. Then, each sheet was formed into a cup having the same shape as that of the cup formed in Example 10 and a wall thickness of 0.3 mm by using the same mold as used in Example 10 according to a solid phase air-pressure forming method (plug assist air-pressure forming method).

For comparison, some of sheets prepared from the foregoing resin blends were formed into cups having the same shape as described above according to a known thermoforming method (melt molding method).

The moldability, the appearance and the oxygen permeation rate determined according to the method described in Example 10, which were evaluated with respect to each of the so prepared cups, are shown in Table 19.

and PS or N2 and PP, the drawability is much inferior and molding according to the solid phase air-pressure forming method is impossible.

EXAMPLE 13

By using a symmetric 5-ply T die for multi-layer extrusion including the same inner and outer layer extruder and intermediate layer extruder as described in Example 10 and an adhesive layer extruder installed with a full-flighted screw having a diameter of 40 mm and an effective length of 890 mm, sheets of a symmetric multi-layer structure having a width of 200 mm and a thickness of about 1 mm were prepared so that the inner and outer layer:adhesive layer:intermediate layer thickness ratio was 1:05:0.1. Resins used for respective layers are as follows: Intermediate Layer:

A mixture containing the same polycaprolactam (N1) and caprolactam/hexamethylene diammonium adipate copolymer (N2) as described in Example 8 and poly-p-xylylene-adipamide (aromatic polyamide, N3) having an Sp value of 11.9 $(cal/cc)^{\frac{1}{2}}$, a melting point of 240° C., as measured according to the method described in Example 1 and an oxygen permeability of $0.041 \times 10^{-11}$ cc.cm/cm$^2$.sec.cmHg was measured at 37° C. and 0% RH, at a mixing weight ratio indicated in Table 20.

Adhesive layer (disposed on each side of intermediate layer):

The same maleic anhydride-modified ethylene-propylene copolymer as described in Example 11.

Inner and Outer Layers (disposed on both sides of adhesive layers):

TABLE 19

| Kinds of Resins | | | Mixing Ratios (% by weight) | | | Molding Method (molding temperature, °C.) | Moldability | Appearance of Cup | Oxygen Permeation Rate (37° C., 0% RH) [cc/m$^2$ . day . atm] |
|---|---|---|---|---|---|---|---|---|---|
| A | B | C | A | B | C | | | | |
| EV | N1 | — | 70 | 30 | — | solid phase air-pressure forming (160) | good | transparent | 0.59 |
| EV | N1 | — | 50 | 50 | — | solid phase air-pressure forming (155) | good | transparent | 1.8 |
| EV | N2 | — | 70 | 30 | — | solid phase air-pressure | good | transparent | 0.49 |
| N1 | PS | — | 50 | 50 | — | solid phase air pressure forming (180) | molding impossible*$^1$ | — | — |
| N2 | PP | — | 50 | 50 | — | solid phase air-pressure forming (160) | molding impossible*$^1$ | — | — |
| EV | N2 | XT | 45 | 45 | 10 | solid phase air-pressure forming (150) | good | transparent | 2.3 |
| EV | N2 | SU | 45 | 45 | 10 | solid phase air-pressure forming (150) | good | transparent | 2.5 |
| EV | N1 | — | 70 | 30 | — | heating molding (230) | molding impossible*$^2$ | — | — |
| EV | N1 | — | 50 | 50 | — | heating molding (230) | possible*$^3$ | transparent | 2.5 |
| EV | N2 | — | 70 | 30 | — | heating molding (205) | possible*$^3$ | transparent | 1.3 |
| EV | N2 | — | 50 | 50 | — | heating molding (205) | possible*$^3$ | transparent | 2.8 |
| EV | N2 | XT | 45 | 45 | 10 | heating molding (205) | possible*$^3$ | semi-transparent | 3.9 |
| EV | N2 | SU | 45 | 45 | 10 | heating molding (205) | possible*$^3$ | semi-transparent | 3.8 |

*$^1$breakage took place at molding
*$^2$conspicuous thickness non-uniformity (very thin portions are locally formed)
*$^3$slight thickness non-uniformity As will be apparent from the results shown in Table 19, in cups formed by the solid phase air-pressure forming method, the oxygen permeation resistance and transparency are remarkably improved by the drawing effect and are much higher than in cups formed by the heating molding method. Further, in connection of the moldability, occurrence of an undesired phenomenon of thickness non-uniformity can be effectively prevented by adoption of the solid phase air-pressure forming method. From the results shown in Table 19, it will also be seen that in case of a resin combination in which the difference (ΔSp) of the solubility parameter is greater than 4.5, for example, in case of a combination of N1

The same isotactic polypropylene as described in Example 8.

Each of the so obtained 4 sheets was uniformly heated in an atmosphere maintained at 150° C. for 30 minutes and molded into a cup having the same shape as that of the cup obtained in Example 10 according to the solid phase air-pressure forming method.

For comparison, each of the foregoing 4 sheets was formed into a cup having the same shape as described above according to the thermoforming method.

With respect to each of the so prepared cups, the moldability was examined, the haze (Hz) was determined according to the method of JIS K-6714, and the oxygen permeation rate ($QO_2$) was determined according to the method described in Example 10. Obtained results are shown in Table 20.

TABLE 20

| Molding Method | Resin Mixing Weight Ratio in Intermediate Layer | Moldability | Haze (Hz) | Oxygen Permeation Rate (37° C., 60% RH) [cc/m². day . atm] |
|---|---|---|---|---|
| solid phase air-pressure forming | N1/N3 = 50/50 | good | 10.5 | 19.2 |
| solid phase air-pressure forming | N1/N2 = 30/70 | good | 12.2 | 13.2 |
| solid phase air-pressure forming | N2/N3 = 50/50 | good | 8.3 | 16.3 |
| solid phase air-pressure forming | N2/N3 = 30/70 | good | 9.6 | 12.2 |
| thermoforming | N1/N3 = 50/50 | good | 16.2 | 31.3 |
| thermoforming | N1/N3 = 30/70 | good (slight thickness non-uniformity) | 18.1 | 30.5 |
| thermoforming | N2/N3 = 50/50 | good | 15.2 | 29.3 |
| thermoforming | N2/N3 = 30/70 | good | 16.1 | 25.2 |

From the results shown in Table 20, it will readily be understood that in cups prepared according to the solid phase air-pressure forming method, the transparency and oxygen permeation resistance can be remarkably improved and are much higher than in cups formed by the thermoforming method.

EXAMPLE 14

Sheets of a symmetric 5-layer structure having a width of 200 mm and a total thickness of 1 mm in which the outer and inner layer:adhesive layer:intermediate layer thickness ratio of 1:0.05:0.1 were prepared by using the T die type sheet forming machine described in Example 13. Resins used for respective layers are as follows:

Intermediate Layer:

A mixture containing the same ethylene-vinyl alcohol copolymer (EV) and caprolactam/hexamethylene diammonium adipate copolymer (N2) as described in Example 8 at an EV/N2 mixing weight ratio of 70/30 or 50/50.

Adhesive Layer:

A mixture of modified polypropylene (QB 010 manufactured by Mitsui Petrochemical Co.; hereinafter referred to as "CMP1") formed by chemically modifying isotactic polypropylene with an unsaturated carboxylic acid and an unsaturated carboxylic acid-modified ethylene-vinyl acetate copolymer (modified EVA; hereinafter referred to as "CMP2") disclosed as an adhesive resin for bonding polyolefin to an ethylene-vinyl alcohol copolymer in Japanese Patent Application Laid-Open Specification No. 76366/76, at an CMP1/CMP2 mixing weight ratio of 30/70 or 50/50.

Inner and Outer Layers:

The same isotactic polypropylene (PP) as described in Example 8.

Each of the so prepared 4 sheets was uniformly heated in an atmosphere maintained at 150° C. for 30 minutes. Then, 8 cups were prepared from the so heat-treated sheets according to the same solid phase air-pressure forming method and thermoforming method as described in Example 13.

With respect to each of the so prepared cups, the haze (Hz), oxygen permeation rate and the T peel strength (adhesion strength of sample 2 cm in width at a peeling speed of 100 mm/min) were determined according to the same methods as described in Example 13 to obtain results shown in Table 21.

Four cups indicated in Table 21 were filled with a 50:50 mixture of water and salad oil, and each cup had the mouth portion heat-sealed with an aluminum-laminated film and was allowed to stand still in an autoclave maintained at 120° C. and 1.5 atmospheres for 60 minutes, following which the water/salad oil mixture was discharged from the cup. The appearance conditions (peeling between the adjacent layers, damage and deformation) of the so heat-treated cups were examined to obtain results shown in Table 21.

From the results shown in Table 21, it will readily be understood that in cups molded according to the solid phase air-pressure forming method, the transparency and oxygen permeation resistance can be highly improved and are much higher than in cups formed according to the customary thermoforming method.

TABLE 21

| Molding Method | Resin Mixing Weight Ratio in Intermediate Layer | Resin Mixing Weight Ratio in Adhesive Layer | Haze (Hz) | Oxygen Permeation Rate (37° C.) RH 60%) [cc/m². day . atm] | Peel Strength (T peel) [g/2 cm width] | Appearance Conditions after Heat Treatment under Pressure |
|---|---|---|---|---|---|---|
| solid phase air-pressure forming | EV/N2 = 70/30 | CMP1/CMP2 = 30/70 | 5.8 | 2.1 | 219 | not changed |
| solid phase air-pressure forming | EV/N2 = 70/30 | CMP1/CMP2 = 50/50 | 5.6 | 2.2 | 135 | * |
| solid phase air-pressure forming | EV/N2 = 50/50 | CMP1/CMP2 = 30/70 | 6.1 | 4.9 | 151 | * |
| solid phase air-pressre forming | EV/N2 = 50/50 | CMP1/CMP2 = 50/50 | 5.4 | 5.1 | 368 | not changed |

TABLE 21-continued

| Molding Method | Resin Mixing Weight Ratio in Intermediate Layer | Resin Mixing Weight Ratio in Adhesive Layer | Haze (Hz) | Oxygen Permeation Rate (37° C.) RH 60%) [cc/m$^2$ . day . atm] | Peel Strength (T peel) [g/2 cm width] | Appearance Conditions after Heat Treatment under Pressure |
|---|---|---|---|---|---|---|
| thermoforming | EV/N2 = 70/30 | CMP1/CMP2 = 30/70 | 15.2 | 5.2 | 536 | changed |
| thermoforming | EV/N2 = 70/30 | CMP1/CMP2 = 50/50 | 16.2 | 5.3 | 321 | * |
| thermoforming | EV/N2 = 50/50 | CMP1/CMP2 = 30/70 | 15.3 | 8.6 | 395 | * |
| thermoforming | EV/N2 = 50/50 | CMP1/CMP2 = 50/50 | 18.2 | 9.2 | 623 | changed |

*: not tested

EXAMPLE 15

Sheets of a symmetric 5-layer structure having a width of 200 mm and a total thickness of 1 mm in which the inner and outer layer:adhesive layer:intermediate layer thickness ratio of 1:0.05:0.1 were prepared by using the same T die type sheet forming machine as described in Example 13. Resins used for respective layers are as follows:

Intermediate Layer:

A mixture formed by dry-blending at a weight ratio of 50/50 the same ethylene-vinyl alcohol copolymer (EV) and caprolactam/hexamethylene diammonium adipate copolymer (N2) as described in Example 8.

Adhesive Layer:

A mixture formed by dry-blending the same caprolactam/hexamethylene diammonium adipate copolymer (N2) as described in Example 8 and the same maleic anhydride-modified ethylene-propylene copolymer (d) as described in Example 11 at an N2/(d) mixing weight ratio of 40/60.

Inner and Outer Layer:

The same ethylene-propylene copolymer (PPE) as described in Example 11.

Each of the so prepared sheets was uniformly heated in an atmosphere maintained at 150° C. for 30 minutes, and the heated sheets were molded into cups according to the same solid phase air-pressure forming method and thermoforming method as described in Example 13.

For comparison, cups having the same shape, dimensions, thickness and thickness ratio as described above were molded in the same manner as described above acording to the solid phase air-pressure forming method and the thermoforming method by using as the intermediate layer-constituting resin a mixture formed by dry-blending the above ethylene-vinyl alcohol copolymer (EV) and the same isotactic polypropylene (PP) and Surlyn ® A (SU) as described in Example 8 at an EV/PP/SU mixing weight ratio of 50/40/10, as the adhesive layer-constituting resin a mixture formed by dry-blending the same unsaturated carboxylic acid-modified ethylene-vinyl acetate copolymer (CMP2) and unsaturated carboxylic acid-modified polypropylene (CMP1) as described in Example 14 at a CMP1/CMP2 mixing weight ratio of 40/60 and as the inner and outer layer-constituting resin the above-mentioned ethylene-propylene copolymer (PPE).

Wih respect to each of the so prepared 4 cups, the haze (Hz) of the cup side wall, the oxygen permeation rate QO$_2$ and the interlaminar strength were determined according to the methods described in Example 14 to obtain results shown in Table 22.

TABLE 22

| Molding Method | Intermediate Layer | Adhesive Layer | Haze (Hz) | Oxygen Permeation Rate (37° C., RH 60%) [cc/m$^2$ . day . atm] | Peel Strength (T peel) [g/2 cm width] |
|---|---|---|---|---|---|
| solid phase air-pressure forming | EV/N2 | N2/CMP | 12.2 | 4.8 | 923 |
| solid phase air-pressure forming | EV/PP/SU | CMP1/CMP2 | 31.0 | 82.9 | 83 |
| Thermoforming | EV/N2 | N2/CMP | 7.2 | 9.1 | 436 |
| Thermoforming | EV/PP/SU | CMP1/CMP2 | 10.1 | 7.2 | 235 |

This Example illustrates retorable containers for which an especially high adhesion strength is required. From the results shown in Table 22, it will readily be understood that in a molded structure comprising an intermediate layer composed of a mixture of an ethylene-vinyl alcohol copolymer and a caprolactam/hexamethylene diammonium adipate copolymer, the oxygen permeation resistance can be highly improved by the drawing effect according to the solid phase air-pressure forming. The haze (Hz) of this cup is a little inferior to that of a thermoformed cup having the same intermediate layer. The reason is that the adhesive layer is composed of a so-called non-compatible mixture. However, the adhesion strength of this cup is much higher than that of the thermoformed cup. On the other hand, in a comparative cup comprising an intermediate layer composed of a mixture of an ethylene-vinyl alcohol copolymer, polypropylene and Surlyn ® A, any of the haze, oxygen permeation resistance and peel strength is not improved by the drawing effect according to the solid phase air-pressured forming.

What we claim is:

1. A molded container having a wall composed of a thermoplastic resin oriented in at least one direction on the wall face, wherein the container wall consists essentially of a single layer of a blend composed mainly of a plurality of melt-extrudable thermoplastic resins, each of said thermoplastic resins having a solubility parameter (Sp) of at least 9.5, each of said thermoplastic resins having an oxygen permeability lower than $5 \times 10^{-11}$ cc·cm/cm$^2$·sec·cmHg, said thermoplastic resins being chosen so that the difference ($\Delta$Sp) of the solubility parameter in said thermoplastic resins is not greater than 4.5, one (A) of said thermoplastic resins having an oxygen permeability lower than $5\times 10^{-11}$ cc·cm/cm$^2$·sec·cmHg and being an ethylene-vinyl alcohol copolymer having an ethylene content of 25 to 50 mole %, another (B) of said thermoplastic resins having an oxygen permeability lower than $5\times 10^{-11}$ cc·cm/cm$^2$·sec·cmHg and including at least one member selected from homopolyamides and copolyamides having 3 to 30 amide groups per 100 carbon atoms in the molecule, said blend being one formed by mixing said resin (A) and said resin (B) at a weight ratio (A):(B) of from 90:10 to 10:90 with the elongation of said blend being higher than the arithmetric mean ($\epsilon$) of elongations of respective resins, and wherein said container has been molecularly oriented so that the container has a thermal shrinkability ($\delta$) of at least 5% in the orientation direction of said container wall.

2. A molded container as set forth in claim 1 which is formed from a parison of said thermoplastic resin blend by biaxial draw-blow molding and has a unit volume of 0.01 to 5 dl per gram of the resin blend.

3. A molded container as set forth in claim 1 which is a seamless cup-like container formed from a sheet or film of said thermoplastic resin blend by plastic processing and having a unit volume of 0.01 to 5 dl per gram of the resin blend.

4. A molded container as set forth in claim 1 wherein said blend consists of (A) said ethylene-vinyl alcohol copolymer, (B) at least one member selected from the group consisting of homopolyamides and copolyamides, and (C) at least one member selected from the group consisting of a polyolefin, a styrene polymer, an elastomer, an ethylene-vinyl acetate copolymer and an ionomer, and said member (C) is present in an amount of up to 40% by weight, based on the total weight of the blend.

5. A molded container as set forth in claim 1 wherein said thermoplastic resin (B) is a caprolactam/hexamethylene diammonium adipate copolymer.

6. A molded container having a wall composed of a thermoplastic resin oriented in at least one direction on the wall face, wherein the container wall has a multi-layer structure including at least one layer of a blend composed of a plurality of melt-extrudable thermoplastic resins, each of said thermoplastic resins having a solubility parameter (Sp) of at least 9.5 and at least one layer composed of a moisture-resistant thermoplastic resin having a moisture permeability lower than $100\times 10^{-12}$ g·cm/cm$^2$·sec·cmHg as measured at a temperature not exceeding 50° C., each of said thermoplastic resins in said blend layer having an oxygen permeability lower than $5\times 10^{-11}$ cc·cm/cm$^2$·sec·cmHg, one (A) of said thermoplastic resins being an ethylene-vinyl alcohol copolymer having an ethylene content of 25 to 50 mole %, another (B) of said thermosplastic resins in said blend layer including at least one member selected from the group consisting of homopolyamides and copolyamides having 3 to 30 amide groups per 100 carbon atoms in the molecule, said blend being one formed by mixing said resin (A) and said resin (B) at a weight ratio (A):(B) of from 90:10 to 10:90 with the difference ($\Delta$Sp) of the solubility parameter in said thermoplastic resins being not greater than 4.5 and the elongation of said resin blend being higher than the arithmetric mean ($\epsilon$) of elongations of the respective thermoplastic resins in the resin blend, said moisture-resistant thermoplastic resin being a polyolefin or a copolymer of an olefin with a carbonyl group-containing ethylenically unsaturated monomer, the multi-layer structure including an inner layer of said moisture-resistant thermoplastic resin, an intermediate layer of said blend and an outer layer of said moisture-resistant thermoplastic resin, said multi-layer structure has an interlaminar bonding strength of at least 20 g/cm, and said multi-layer structure having been molecularly oriented so that said structure has a thermal shrinkability ($\delta$) of at least 5% in the orientation direction of said container wall.

7. A molded container as set forth in claim 6 wherein the moisture-resistant thermoplastic resin is a polyolefin, the layer of the blend is formed adjacently to the layer of the polyolefin, and a thermoplastic polymer having a carbonyl group content of 120 to 1400 meq/100 g of the polymer is incorporated in the blend or polyolefin in an amount of 0.5 to 15 parts by weight per 100 parts by weight of the blend or polyolefin.

8. A container formed by biaxial draw-blow molding of a parison composed of a thermoplastic resin, said parison having a multi-layer structure including at least one layer of a blend composed mainly of a plurality of melt-extrudable thermoplastic resins, each melt-extrudable thermoplastic resin having a solubility parameter (Sp) of at least 9.5, and at least one layer composed of a creep-resistant thermoplastic resin in which the sum of the instantaneous modulus (Eg) and retardation modulus ($E_1$) at a temperature of 23° C. and a stress of $7\times 10^7$ dyne/cm$^2$ is at least $1\times 10^{10}$ dyne/cm$^2$ and which has a steady state flow viscosity ($\eta_\infty$) of at least $1\times 10^{17}$ poise and a retardation time ($t_R$) shorter than $6\times 10^6$ sec, each of said thermoplastic resins in said blend having an oxygen permeability lower than $5\times 10^{-11}$ cc·cm/cm$^2$·sec·cmHg, one (A) of said thermoplastic resins in said blend being an ethylene-vinyl alcohol copolymer having an ethylene content of 25 to 50 mole %, another (B) of said thermoplastic resins in said blend including at least one member selected from the group consisting of homopolyamides and copolyamides having 3 to 30 amide groups per 100 carbon atoms in the molecule, said blend being one formed by mixing said resin (A) and said resin (B) at a weight ratio (A):(B) of from 90:10 to 10:90, with the difference ($\Delta$Sp) of the solubility parameter in said thermoplastic resins being not greater than 4.5 and the elongation of said resin blend being higher than the arithmetric mean ($\epsilon$) of elongations of the respective thermoplastic resins in the resin blend, the creep-resistant thermoplastic resin being a member selected from the group consisting of polyethylene terephthalate, polybutylene terephthalate, polycarbonates, acrylonitrile-butadiene-styrene resins, acrylonitrile-styrene resins, polyacetals, polyamides, polymethyl methacrylate, isotactic polypropylene, polystyrene, polyacrylates, polyphenylene oxide and polysulfones, and wherein said molded container is molecularly oriented so that said container has a thermal shrinkability ($\delta$) of at least 5% in the orientation direction of said container wall.

9. A molded container as set forth in claim 8 wherein said parison has a multi-layer structure including an inner layer of said creep-resistant thermoplastic resin, an intermediate layer of said blend and an outer layer of said creep-resistant thermoplastic resin.

10. A container formed by draw molding of a film or sheet composed of a thermoplastic resin, said film or sheet having a multi-layer structure including at least one layer of a blend composed mainly of a plurality of melt-extrudable thermoplastic resins, each of said melt-extrudable thermoplastic resins having a solubility parameter (Sp) of at least 9.5, and at least one layer composed of a creep-resistant thermoplastic resin in which the sum of the instantaneous modulus (Eg) and retardation modulus ($E_1$) at a temperature of 23° C. and a stress of $7 \times 10^7$ dyne/cm$^2$ is at least $1 \times 10^{10}$ dyne/cm$^2$ and which has a steady state flow viscosity ($\eta_\infty$) of at least $1 \times 10^{17}$ poise and a retardation time ($t_R$) shorter than $6 \times 10^6$ sec., each of said thermoplastic resins in said blend having an oxygen permeability lower than $5 \times 10^{-11}$ cc·cm/cm$^2$·sec·cmHg, one (A) of said thermoplastic resins in said blend being an ethylene-vinyl alcohol copolymer having an ethylene content of 25 to 50 mole %, another (B) of said thermoplastic resins in said blend including at least one member selected from the group consisting of homopolyamides and copolyamides having 3 to 30 amide groups per 100 carbon atoms in the molecule, said blend being one formed by mixing said resin (A) and said resin (B) at a weight ratio (A):(B) of from 90:10 to 10:90 with the difference (ΔSp) of the solubility parameter in said thermoplastic resins being not greater than 4.5 and the elongation of said resin blend being higher than the arithmetric mean (ε) of elongations of the respective thermoplastic resins in the resin blend, the creep-resistant thermoplastic resin being a member selected from the group consisting of polyethylene terephthalate, polybutylene terephthalate, polycarbonates, acrylonitrile-butadiene-styrene resins, acrylonitrile-styrene resins, polyacetals, polyamides, polymethyl methacrylate, isotactic polypropylene, polystyrene, polyacrylates, polyphenylene oxide and polysulfones, said multi-layer structure having an interlaminar bonding strength of at least 20 g/cm, and wherein said molded container is molecularly oriented so that said container has a thermal shrinkability (δ) of at least 5% in the orientation direction of said container wall.

11. A molded container as set forth in claim 10 wherein said sheet or film has a multi-layer structure including an inner layer of said creep-resistant thermoplastic resin, an intermediate layer of said blend and an outer layer of said creep-resistant thermoplastic resin.

* * * * *